(12) United States Patent
Wilson et al.

(10) Patent No.: US 7,356,841 B2
(45) Date of Patent: Apr. 8, 2008

(54) SERVER AND METHOD FOR PROVIDING SPECIFIC NETWORK SERVICES

(75) Inventors: Tim Wilson, Halifax (CA); Michael Thompson, Halifax (CA)

(73) Assignee: SolutionInc Limited, Halifax, Nova Scotia (CA)

( * ) Notice: Subject to any disclaimer, the term of this patent is extended or adjusted under 35 U.S.C. 154(b) by 1172 days.

(21) Appl. No.: 09/853,716

(22) Filed: May 14, 2001

(65) Prior Publication Data

US 2002/0009078 A1    Jan. 24, 2002

Related U.S. Application Data

(60) Provisional application No. 60/203,932, filed on May 12, 2000.

(51) Int. Cl.
*H04L 12/28* (2006.01)
(52) U.S. Cl. .................... 726/15; 726/2; 726/3; 726/12; 726/15; 709/205; 709/206; 709/207; 709/227; 709/228; 709/229; 709/223; 370/389
(58) Field of Classification Search .................... 726/3, 726/11, 12; 709/223
See application file for complete search history.

(56) References Cited

U.S. PATENT DOCUMENTS

| | | | | |
|---|---|---|---|---|
| 4,823,338 | A | * | 4/1989 | Chan et al. .................. 370/522 |
| 6,035,405 | A | * | 3/2000 | Gage et al. .................... 726/15 |
| 6,052,725 | A | | 4/2000 | McCann et al. |
| 6,085,238 | A | * | 7/2000 | Yuasa et al. ................. 709/223 |
| 6,188,691 | B1 | * | 2/2001 | Barkai et al. ................ 370/390 |

(Continued)

FOREIGN PATENT DOCUMENTS

EP    0 872 998    10/1998

(Continued)

OTHER PUBLICATIONS

Wright M: "Using policies for effective network management" International Journal of Network Management, Wiley, GB, vol. 9, No. 2, Mar. 1999, pp. 118-125, XP002116275 ISSN: 1055-7148 p. 119, left-hand column, line 35—p. 122, left-hand column, line 5.

(Continued)

*Primary Examiner*—Ayaz Sheikh
*Assistant Examiner*—Saoussen Besrour

(57) ABSTRACT

A server and method is provided to provide a specific service to network users. The server and method automatically provide user-to-server security using VLANs. The server manages VLAN based on the request from a user for creating/deleting/joining/leaving VLANs. The server allows user to control groupings and overcomes the VLAN limit with the filtering policies on the switching infrastructure. In the second aspect of invention, the server and method provide a specific address based on requests from users. The server dynamically handles the management and facilitation of the requests. The server offers users reassignment of IP addresses from a first set of characteristics to a second set of characteristics with minimal user intervention. This allows users the ability to run a broader range of protocols. In the third aspect of invention, the server and method is provided to provide a routable IP address to a remote computer. The server allows pools of routable addresses to be maintained on one or more remote servers. The server can solve the shortage of the routable IP addresses.

20 Claims, 23 Drawing Sheets

U.S. PATENT DOCUMENTS

| | | | |
|---|---|---|---|
| 6,223,218 B1 * | 4/2001 | Iijima et al. | 709/221 |
| 6,636,894 B1 | 10/2003 | Short et al. | |
| 2005/0198136 A1 * | 9/2005 | Kawamoto et al. | 709/204 |
| 2006/0239254 A1 * | 10/2006 | Short et al. | 370/352 |

FOREIGN PATENT DOCUMENTS

| | | |
|---|---|---|
| EP | 0998099 | 5/2000 |
| WO | WO 9805146 | 2/1998 |
| WO | WO 99 39477 A | 8/1999 |
| WO | WO 99 56436 A | 11/1999 |

OTHER PUBLICATIONS

Interworking Task Group of IEEE 802.1; "Draft Standard P802.IQ/D7 IEEE Standards for Local and Metropolitan Area Networks: Virtual Bridged Local Area Networks" IEEE Standards—Oct. 3, 1997 ; pp. 187-198, XPOO2186357 New York—the whole document.

* cited by examiner

SERVER AND METHOD FOR PROVIDING SPECIFIC NETWORK SERVICES

This application claims the benefit of U.S. Provisional Application No. 60/203,932 filed on May 12, 2000.

FIELD OF THE INVENTION

This invention relates to an Internet access server such as described in U.S. application Ser. No. 09/742,006, filed Dec. 22, 2000, the contents of which are incorporated herein by reference. The preferred embodiment of the Internet access server described in U.S. application Ser. No. 09/742,006, will be referred herein as the SolutionIP server.

BACKGROUND OF THE INVENTION

Local Area Networks (LANs) are data communication networks that span a physically limited area. LANs allow users to have shared access to many common resources, such as files, printers, or other communication devices. The concept of shared access to resources is central to the LAN philosophy.

Security, on the other hand, in traditional LANs is a major problem. For instance, in broadcast networks, everyone can see every packet on the network. Therefore, without the use of Virtual Local Area Networks (VLANs), it is possible for users on the system to see network traffic from or destined for other users. This presents a security problem for the system and its users.

A VLAN is a logical subgroup within a Local Area Network that offers an effective solution to the LANs problems. The major features of VLANs are flexible network segmentation and enhanced network security.

However, when VLANs are used for security and group collaboration, generally they have to be manually configured ahead of time, on switching hardware. Furthermore, there is a finite number of VLANs that the switching hierarchy can support and this physical limitation on the number of VLANs supported may be an issue.

In addition, some network protocols require fully routable Internet Protocol(IP) addresses to function (e.g. tunnelling protocols including Virtual Private Networks (VPNs)). Typically a user requesting a dynamic IP address can be given either a routable or non-routable IP address depending upon the configuration of the Dynamic Host Configuration Protocol (DHCP) server on that network.

Since in a traditional network, dynamic switching from non-routable to routable IP address is not handled by the server, users are left to their own devices if they require a routable IP address, but were served a non-routable IP address.

SUMMARY OF THE INVENTION

It is an object of the present invention to overcome one or more of the problems cited above. A first aspect of the present invention is directed to a server and method for interpreting and processing VLAN tags coupled with server communication with the switching infrastructure for VLAN management.

A method according to the present invention for automatically providing enhanced and secure access to a group of users initiated by a non-technically trained user on a computer network without the intervention of information systems personnel includes the steps of receiving a request from the a user to establish the group of users; configuring a network infrastructure to support the group; providing a group identifier; allowing users to join the group according to the group identifier; further configuring the network infrastructure to support the joining users; and dissolving the group based on predetermined rules.

A server according to the present invention provides enhanced and secure access to a group of users initiated by a non-technically trained user on a computer network without the intervention of information systems personnel and includes a registration module to receive a request including a group identifier from the user; a registration driver to register the user to access the group of users, assign the group of users and maintain registration information and state information of a network infrastructure associated with the group of users; a module to assign VLAN tags based on registration status; and a packet driver module to insert/ remove VLAN tags from packets based on registration status.

According to the aforementioned invention, user-to-server security is automatically provided using VLANs whose management is automated by the server. The server facilitates user initiated group collaboration by placing users requesting the service in the same VLAN. Additionally, VLAN limits can be overcome through creative use of the filtering policies on the switching infrastructure.

User-to-server security can be further provided by placing each individual user into a separate VLAN. The server's automation and management of VLAN creation/deletion facilitates this process, which allows a user to control groupings of users into common VLANs (i.e. group collaboration). Further, the filtering policies implemented on the switches allow users to utilize a broad range of VLANs.

Another aspect of the present invention is directed to a server and method for dynamically providing an address according to users' requests.

A method according to the present invention for dynamically managing pools of IP addresses on a computer network with different characteristics and moving a user from pool to pool as required includes the steps of maintaining a registry of user records and associated sets of characteristics; further maintaining a registry of IP address pools with associated sets of characteristics; receiving a request from a user to switch from a first set of characteristics to a second set of characteristics; modifying the user record in the registry so that the set of characteristics associated with the user matches the second set of characteristics; and assigning an IP address to the user from the IP address pool associated with the second set of characteristics.

A server according to the present invention dynamically manages pools of IP addresses on a computer network with different characteristics and moves a user from pool to pool as required, and includes a module to receive a request from a user to switch from a first set of characteristics to a second set of characteristics; a registration driver to register the user and assign an IP address to the user from IP address pools associated with the second set of characteristics, and maintain a registry of user records, associated sets of characteristics and IP address pools with associated sets of characteristics; and a DHCP module to issue an address switching request to the registration driver and receive IP addresses from the registration driver and allocate IP addresses to users.

According to the aforementioned invention, the server dynamically handles the management and facilitation of the requests. The server offers users reassignment of IP addresses from a first set of characteristics to a second set of characteristics with minimal user intervention. This allows users the ability to run a broader range of protocols.

Another aspect of the present invention is directed to a server and method for providing a routable IP address to a remote computer.

A method according to the present invention for providing a routable IP address to a remote computer includes the steps of providing a pool of routable IP addresses on a server; receiving at the server a request from the remote computer to establish an IP tunnel between the remote computer and the server; establishing an IP tunnel between the remote computer and the server; further receiving a request from the remote computer through the tunnel for the routable IP address from the server; and further providing the routable IP address to the remote computer from the server through the tunnel.

A server according to the present invention provides a routable IP address to a remote computer, and includes a module to receive a request from the remote compute through a tunnel for the routable IP address; a registration driver to assign the routable IP address to the remote computer from a pool of routable IP addresses and establish an IP tunnel; and a DHCP module to provide the routable IP address to the remote computer through the tunnel.

According to the aforementioned invention, the server allows pools of routable addresses to be maintained on one or more remote servers. The server can solve the shortage of the IP routable addresses.

DESCRIPTION OF THE PREFERRED EMBODIMENTS

Figure 1:
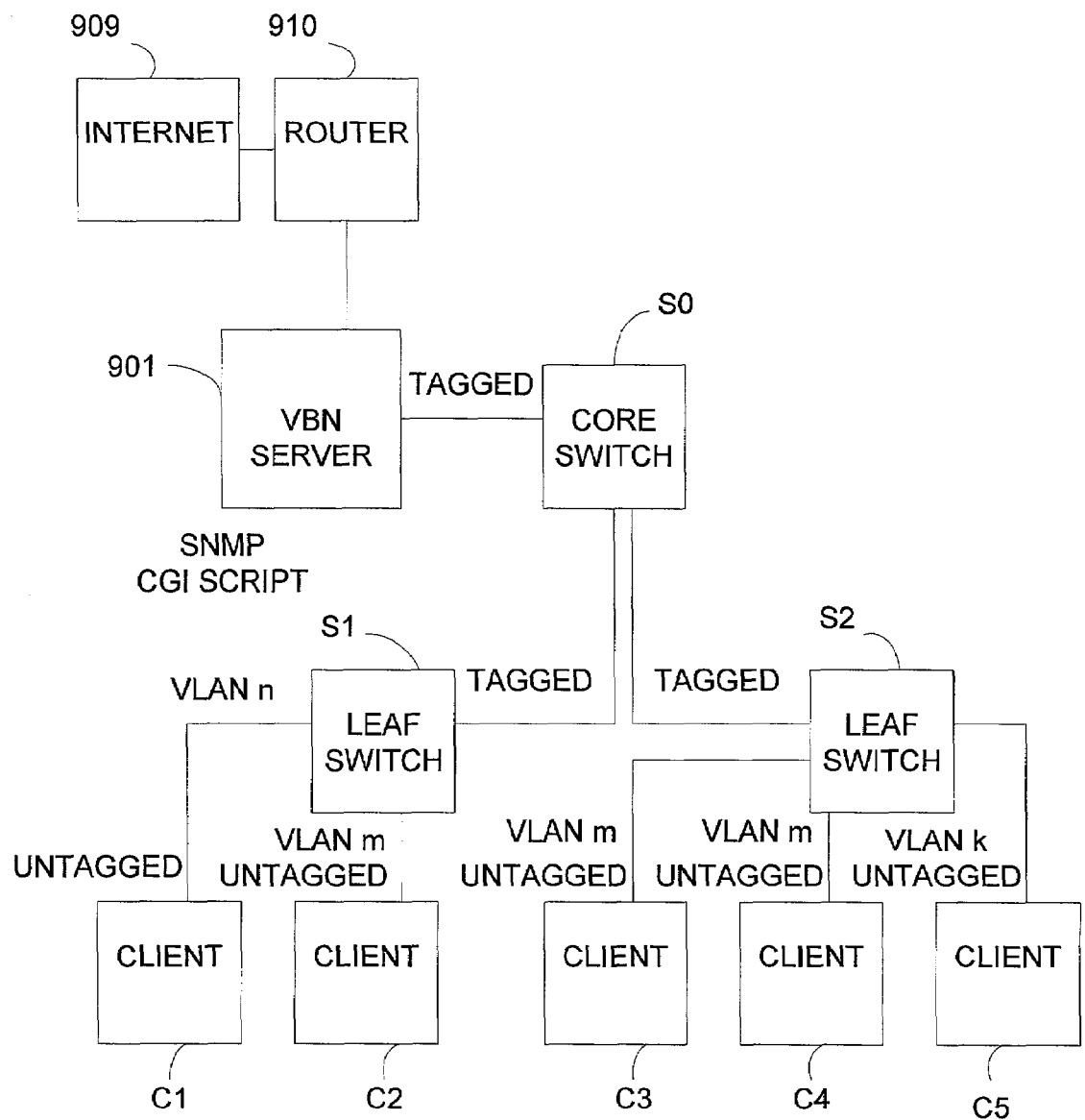
FIG. 1 shows an example of a system structure of a first embodiment of the present invention.

The detailed description of the invention is set out below, including a description of the best mode of implementing the invention. The description is carried out with reference to the drawings.

The invention is referred to from time to time by its trade-mark and means the server and/or other aspects of the invention as the context may dictate. This invention is useful in multi-unit buildings whether used as offices, apartments and/or for hotels or similar accommodation buildings. It is also advantageous to use the invention in seminar rooms, boardrooms, training rooms and like areas where users wish to access the network from the room.

First Embodiment

A VLAN implementation system according to a first embodiment will be described in detail with reference to the drawings.

The main features of the VLAN implementation system are as follows:

processing of VLAN tags by the Internet access server.

switch filtering policies that enable one to effectively bypass the physical limit on the number of VLANs capable of being deployed on the switching infrastructure.

provision of secure collaborative workgroups.

VLAN enabling of the server of the first embodiment allows the processing of VLAN tags and various VLAN services such as: create VLAN, show VLAN, join VLAN, leave VLAN and delete VLAN.

Interactive Virtual Local Network (IVLAN)

A preferred embodiment of the first aspect of the invention will be referred to herein as an Interactive Virtual Local Area Network (IVLAN).

IVLAN is a communications technology that enables devices communicating with the TCP/IP protocol (the communications protocol of the Internet) to gain secure private and group access to any foreign TCP/IP network that has IVLAN installed. A foreign TCP/IP network which allows access on a temporary basis is often termed a Visitor Based Network (VBN), and is typically composed of core and leaf switches which route messages to and from client devices.

A Virtual Local Area Network (VLAN) is typically established on the network of switches to facilitate message traffic. This technology allows for all clients of the VBN to communicate with each other and any services available via the VBN Gateway. The capability for clients to communicate with each other is often suppressed on VBNs due to security considerations; for example, while guests at a hotel may wish to share data with some other guests, it would be considered unacceptable to share that data with every hotel guest registered with the hotel VBN. Since VLAN creation and maintenance must typically be performed manually by a network administrator, most VBN systems will include at most one VLAN.

Overview

The IVLAN technology of the first embodiment allows for the dynamic creation of secure VLANs interactively by registered users of a VBN. The user (client) may create a VLAN group and grant access to other registered users on a group name/password basis. IVLAN also allows for registered users to access VBN Gateway service via a secure private VLAN in which no other user may participate.

IVLAN also allows the client who creates a VLAN Group (referred to as administrator) to delete the created VLAN. IVLAN executes on a variety of operating systems. The preferred embodiment is based on a Linux operating system.

The VLAN implementation system comprises:
1. IEEE (Institute of Electrical and Electronics Engineers) 802.1Q Compliant core switch;
2. IEEE 802.1Q Compliant leaf switches;
3. Custom built Simple Network Manager (SNM);
4. Common Gateway Interface (CGI) Components accessed via HTML (Hypertext Meta Language) pages;
5. Registration Device Driver incorporated into the Linux kernel; and
6. Modified Linux kernel Packet Driver.

IEEE802.1Q is a standard for providing VLAN identification. The IEEE 802.1Q standard provides for the capability to add a "Q-Tag" to an Ethernet frame of a message packet. Information for VLAN identification is added to the frame as a part of the Q-Tag. VLANs are implemented within the switched infrastructure by using Q-Tags.

The following paragraphs describe in more detail the technology encapsulated by IVLAN in the creation, maintenance, and use of VLANs.

An example of a VBN utilizing IVLAN is shown in FIG. 1. Referring to FIG. 1, the VLAN implementation system comprises VBN Server 901, core switch S0 and leaf switches S1 and S2. Clients C1 and C2 connect to the leaf switch S1 and Clients C3, C4 and C5 connect to the leaf switch S2. The leaf switches connect the clients to the core switch S0. The VBN server 901 is an Internet access server. The clients may access the Internet 909 via Router 910 connected to the VBN Server 901.

Each port of the leaf switch can be assigned to at least one VLAN. Client ports are only assigned one VLAN ID and that is the ID that they tag untagged client traffic with. Switch interconnect ports are tagged with every VLAN defined on that switch to allow VLAN traffic to traverse the switch infrastructure. In FIG. 1, the clients are segmented into VLAN k, VLAN n and VLAN m regardless of physical location. For example, in the leaf switch S1, one port is assigned to VLAN n and another port is assigned to VLAN m. In the leaf switch S2, one port is assigned to VLANk and another is assigned to VLAN k and VLAN m.

The client C3 (an administrator) creates a VLAN group (VLAN m) via the VBN Server 901. The clients C2 and C3 are registered to join "VLAN m". Group access allows users to share files, printers, CD-ROMs and so on in a secure and closed environment.

The core switch S0 forwards or filters traffic based on the VLAN identification specified in the Q-Tag. On the Core switch, the packet filter enables group collaboration access by forwarding packets to all uplink ports (connections to the leaf switches) that are defined as members of the same VLAN.

It is noted that the untagged packet is used to communicate between the VBN Server 901 and the Router 910 and between the client and the corresponding leaf switch. Between the VBN Server 901 and the core-leaf switches, the packet is tagged (Q-tag is inserted) or untagged based on client port configuration.

Components and Interactions of the VBN Server

Figure 2:
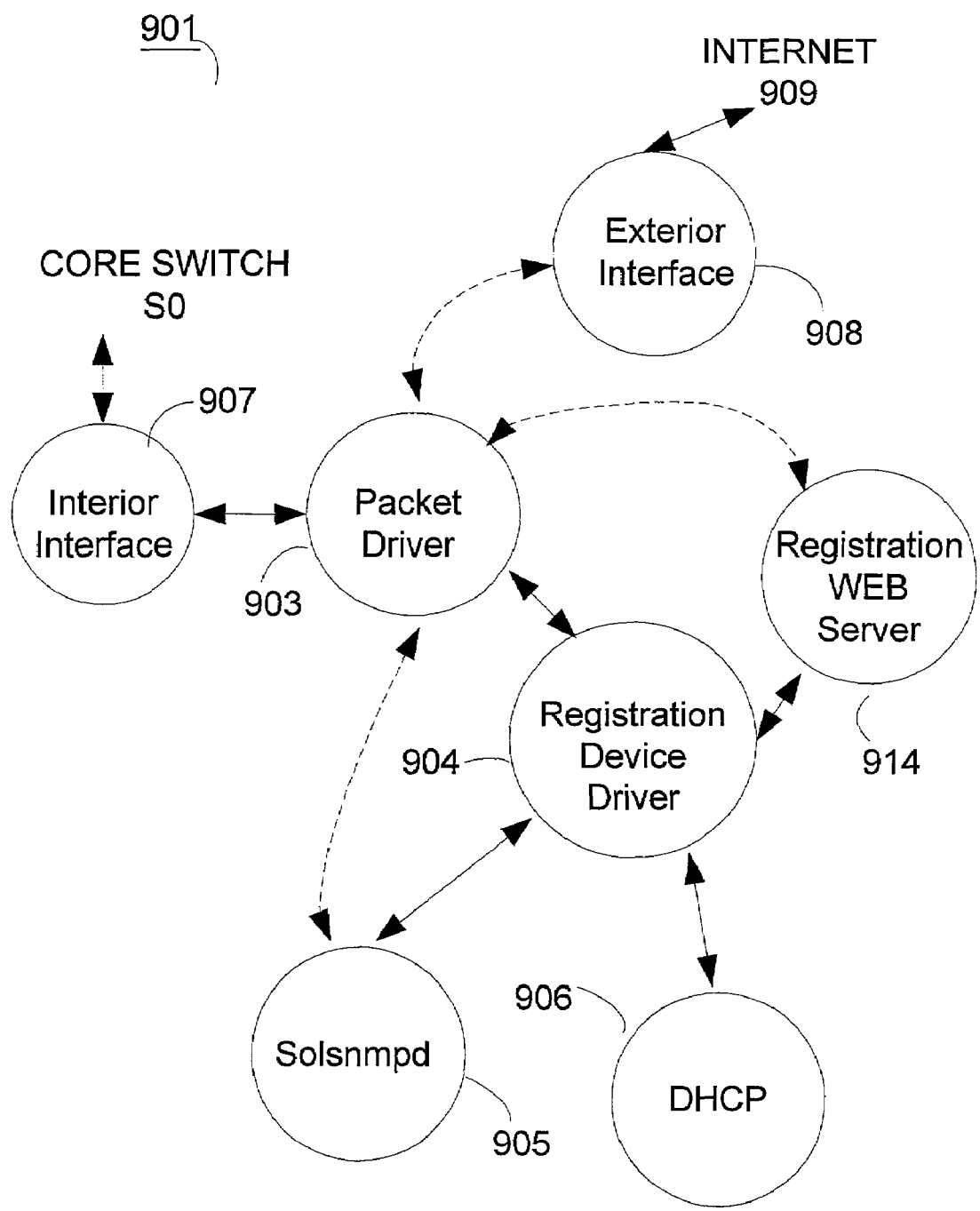
FIG. 2 shows an example of the core components and interactions of the VBN server according to the first embodiment.

FIG. 2 shows the breakdown of the core components of the invention and their interactions according to the first embodiment. The VBN Server 901 connects the core switch and the Internet 909 via the internal interface 907 and the exterior interface 908 respectively.

Registration Device Driver (Sometimes Referred to as Soln Device)

The Registration Device Driver 904 is a pseudo driver in that it is not actually associated with any physical device. The Registration Device Driver 904 manages the assignment of appropriate VLAN IDs for a given registration request The Registration Device Driver 904 maintains the following information;
 registration information including;
  1. the VLAN ID associated with the user;
  2. the switch and port the user is connecting on; and
  3. the VLAN group information for the user.
 driver state information including;
  1. The state information on the switches to manage the switch configuration changes; and
  2. The state information for the VLAN groups.

Packet Driver

The Packet Driver 903 has enhanced functionality over the standard Linux protocol handlers at the point where the generic packet handlers interface with the hardware specific Ethernet drivers.

The Packet Driver 903 handles;
 the reception of Q-tagged packets (replacing the Q-Tag header with a standard Ethernet header and recording the tag the packet arrived with in the registration entry for that Media Access Control (MAC)); and
 the transmission of Q-tagged packets where appropriate (replacing the standard Ethernet header with a Q-Tag header, using the appropriate tag).

Broadcast packets destined for the internal network are treated specially, if appropriate a copy of the tagged packet is sent to each known VLAN (Q-Tag) as well as sending an untagged packet. The replication of broadcast packets is to ensure that the packet is received by all systems regardless of their VLAN.

Registration Web Server

The Registration WEB Server 914 is a WEB Server that serves local content for the VBN server 901. This includes the Registration WEB pages, the Administration WEB pages and Configuration WEB pages.

The Registration WEB page serves as a client's gateway to the services provided by the VBN Server 901. The Registration page offers the clients the opportunity to register for access to the Internet 910, to sign-up for group VLAN access, to create a VLAN group and so on. If the user elects to sign-up for an existing VLAN group, the user will enter the group name and password that will be checked against a database. If the user elects to create a VLAN group, they will be asked to provide a group name and password that will be stored in the database. The component which checks the group name and password against the database is referred to as Authenticator.

These various servers may be hardware or software implemented.

Solsnmpd

Solsnmpd 905 uses a proprietary protocol to accept requests and return results. This daemon handles communications with switches and other network devices on the client network using Simple Network Management Protocol (SNMP). Solsnmpd 905 enables creation of new VLANs on switches, delete VLANs from switches, add and remove ports from VLANs and so on. The Switch Commander is the functionality within the Solsnmpd which performs all VLAN operations. More specifically, the Switch Commander maintains the VLAN definitions on the switches.

The Function of the VBN Server

IVLAN client registration is performed via an HTML interface, where a client may interactively select to create a private VLAN, a group VLAN, or to join an existing group VLAN. If a client registers for access to Internet services available from the VBN Gateway, a private VLAN is established using the core-leaf switch mechanism for the use of the client user.

Alternatively, the client may register to administer a Group VLAN by supplying a VLAN group name and password that other clients may use to gain access to the Group VLAN. The group name and password are recorded by the CGI components that underlie the IVLAN VBN Registration HTML pages. Other clients may indicate upon registration for VBN services that they wish to join an existing Group VLAN by providing the group name and password for authentication.

During the registration process, the CGI components communicate with Solsnmpd through Command Line Daemon (or Soln Daemon)described below which executes on the VBN Server 901. The Solsnmpd process issues SNMP commands to create both private and group VLANs on the core-leaf switch system. Communication ports of the core-leaf switch system are assigned as necessary to the created VLANs as clients register for access.

Private and Group VLANs may co-exist within the VBN due to the ability to tag message packets as they flow through the routing system. As mentioned above, the IEEE 802.1Q standard provides for capability to include a Q-Tag as part of the Ethernet frame of a message packet. The VBN Server 901 manages the addition and removal of Q-Tags for the message traffic of the clients, which need not necessarily contain 802.1Q compliant Network Interface Card (NIC) hardware. The CGI components obtain a Q-Tag generation ID from the Registration Device Driver 904 of the VBN Server 901 during the registration process for the purpose of VLAN creation. The VLAN is created as a final activity of the registration process.

For a private VLAN, utilized for VBN Gateway access, Ethernet frames will be tagged and untagged as part of the packet routing through the core-leaf switch system. When a message is transmitted by a client, the message is untagged. The leaf switch to which the client is connected will insert a Q-Tag in the Ethernet frame before it is routed to the core switch. The message packet is routed through the core switch to the VBN Server 901, where the Q-Tag is stripped from the Ethernet frame by the Packet Driver 903 which executes as part of the VBN Server kernel. The Packet Driver 903 of the VBN Server 901 also inserts Q-Tags into the Ethernet frames of incoming message packets destined for the client. The mapping between client and Q-Tags is based on the client's registration state information.

For a Group VLAN, Ethernet Frames may or may not be tagged as part of the routing of the packet through the system. If all clients belonging to the VLAN are physically connected to the same leaf switch, no Q-Tags need be inserted in the Ethernet frame of the packets. Whether tags are inserted or not in this instance is dependent on the implementation of the given switch, and is not relevant to the operation of IVLAN. However, if clients are connected to different leaf switches within the system, the packets must be routed through the core switch connected to each leaf switch. In this instance, the Ethernet frames will be tagged before leaving the source leaf switch, and untagged before leaving the destination leaf switch. In FIG. 1, as the clients C2,C3 and C4 belonging to VLAN m are physically connected to the different switches, the tagged packet is used for communication between the VBN Server 901 and the clients C2,C3 and C4.

Both private and group VLANs are de-assigned from the communication ports of the switching system at the expiry of the user registration lease. The expiration of the registration is managed by the Registration Device Driver 904.

It is noted that "VLAN ID" or "VLID" is synonymous with a Q-Tag ID (identification).

Registration Process—Join VLAN Group Service

Figure 3:
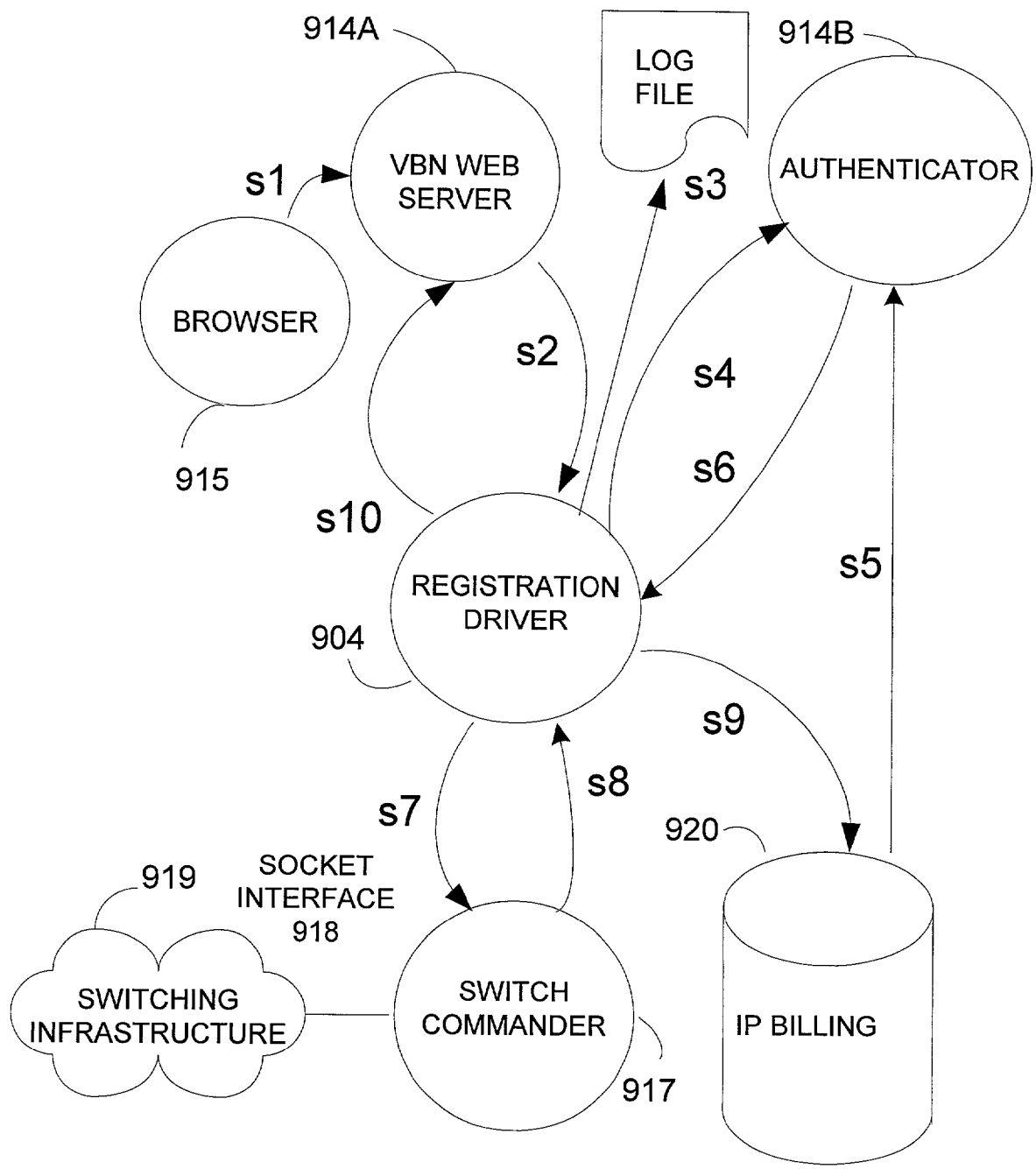
FIG. 3 shows an example of Registration processing according to the first embodiment.

FIG. 3 shows the registration process for join VLAN Group Service. The Registration Driver corresponds to the Registration Device Driver 904 in FIG. 1. The VBN Web Server 914A and the Authenticator 914B correspond to the Registration WEB Server 914 in FIG. 2.

Step s1: The Client/Browser 915 sends data including room number, registration type (VLAN group), group name and access password to VBN Web Server 914A.

Step s2: The VBN Web Server 914A passes data to the Registration Driver 904.

Step s3: If the user's startup parameters are invalid, the event will be logged for diagnostic purposes.

Step s4: If the user's startup parameters are valid, VLAN group name and password are sent to the Authenticator 914B for validation.

Step s5: The Authenticator 914B queries the IP Billing database 920 to determine if the VLAN group name and password match.

Step s6: If a match occurred, the Authenticator 914B will send an authenticated response to the Registration Driver 904.

Step s7: Upon receiving the authenticated response, the Registration Driver 904 will send an "Add Port to VLAN Group" request to the Switch Commander 917. The request will specify the VLAN ID assigned to the group, and the switch and port to be added to the VLAN.

Step s8: On command completion, the Switch Commander 917 will report command status to the Registration Driver 904.

Step s9: If the command is successful, the Registration Driver 904 will register the user by sending the port and registration type to the IP Billing database 920.

Step s10: Registration status is returned to the VBN Web Server 914A.

All client traffic originated or relayed by the VBN server will have the appropriate Q-Tag inserted, if applicable, by the Packet Driver based on their registration status before being passed through the socket interface 918 and on to the switching infrastructure 919.

VLAN Group Administration—Create VLAN Group

Figure 4:
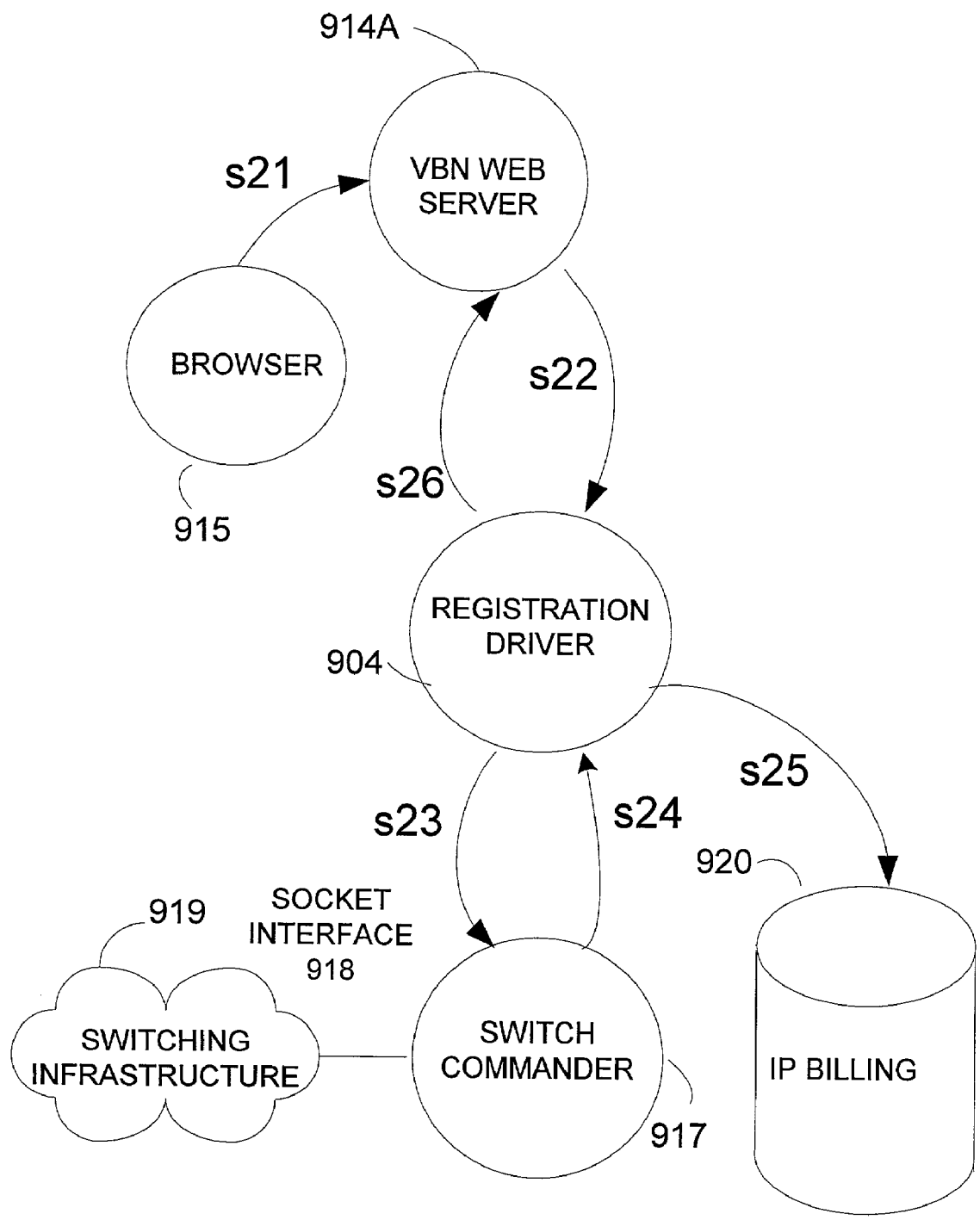
FIG. 4 shows an example of VLAN Group Administration (Create VLAN Group) processing according to the first embodiment.

FIG. 4 shows the process for creating the VLAN Group.

Step s21: The Client/Browser 915 sends data including room number, group administration command (Create VLAN Group), group name, administration password, usage period, and user access password to VBN Web Server 914A.

Step s22: The VBN Web Server 914A passes data to the Registration Driver 904.

Step s23: The Registration Driver 904 will send two command requests to the Switch Commander 917. The first command will create a unique VLAN group definition. The second will add the administrator's port to the VLAN definition.

Step s24: For each command completion, the Switch Commander 917 will report command status to the Registration Driver 904.

Step s25: If the commands were successful, the Registration Driver 904 will send data to IP Billing database 920 to register the administrator's room number, VLAN group name, administration password, usage period and user access password.

Step s26: The Create VLAN status is returned to the VBN Web Server 914A.

VLAN Group Administration—Show VLAN Group

Figure 5:
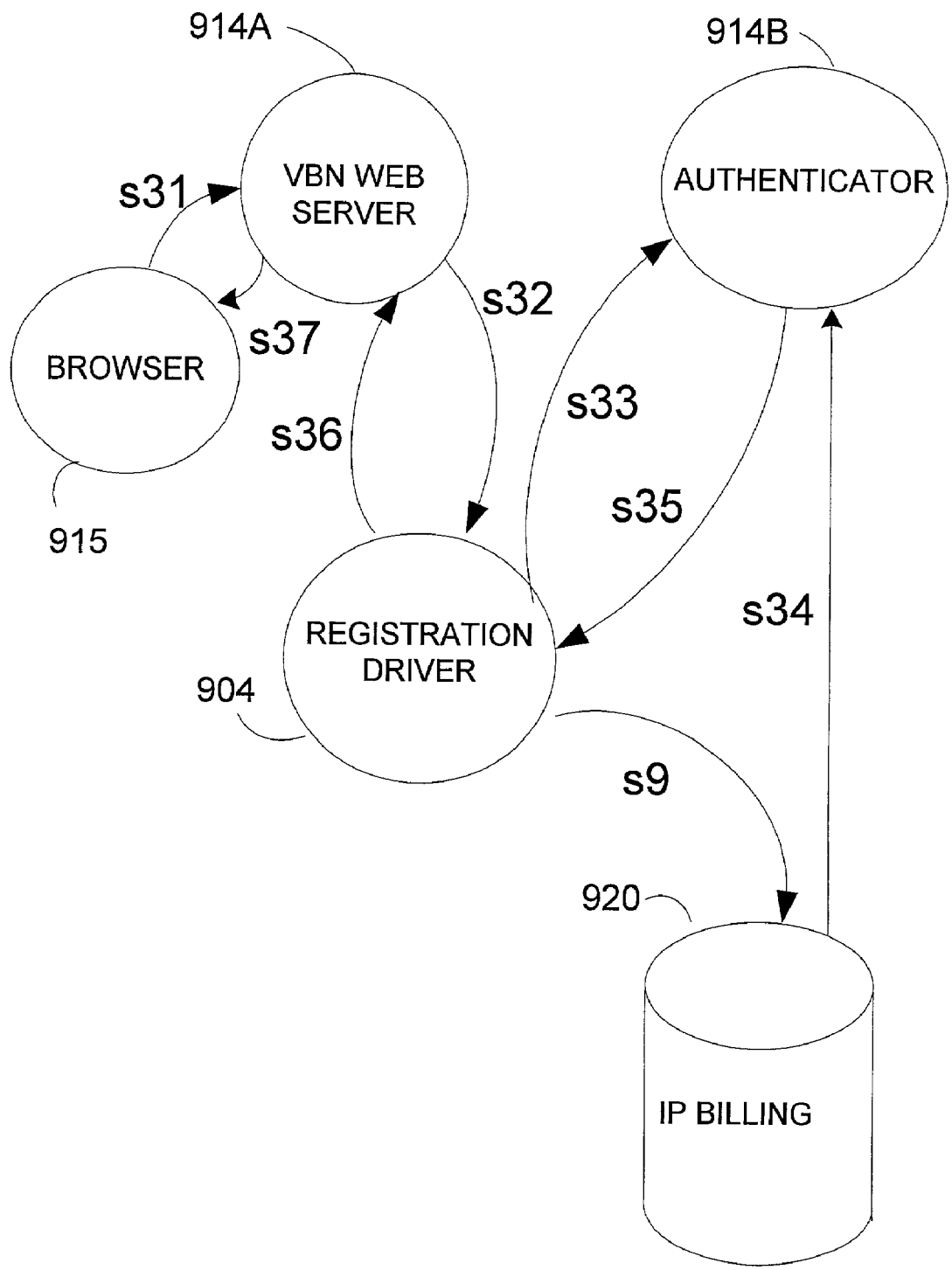
FIG. 5 shows an example of VLAN Group Administration (Show VLAN Group) processing according to the first embodiment.

FIG. 5 shows the process for retrieving VLAN group information.

Step s31: The Client/Browser 915 sends data including room number, group name, administration command (Show VLAN Group ), and administration password to the VBN Web Server 914A.

Step s32: The VBN Web Server 914A passes data to the Registration Driver 904.

Step s33: VLAN group name and administration password are sent to the Authenticator 914B for validation.

Step s34: The Authenticator 914B queries IP Billing database 920 to determining if the VLAN group name and administration password match.

Step s35: If a match occurred, the Authenticator 914B will send an authenticated response to the Registration Driver 904.

Step s36: On command completion, the Registration Driver 904 will send the query results to the VBN Web Server 914A.

Step s37: The VBN Web Server 914A responds to the client's request by sending the retrieved group information.

VLAN Group Administration—Delete VLAN Group

Figure 6:
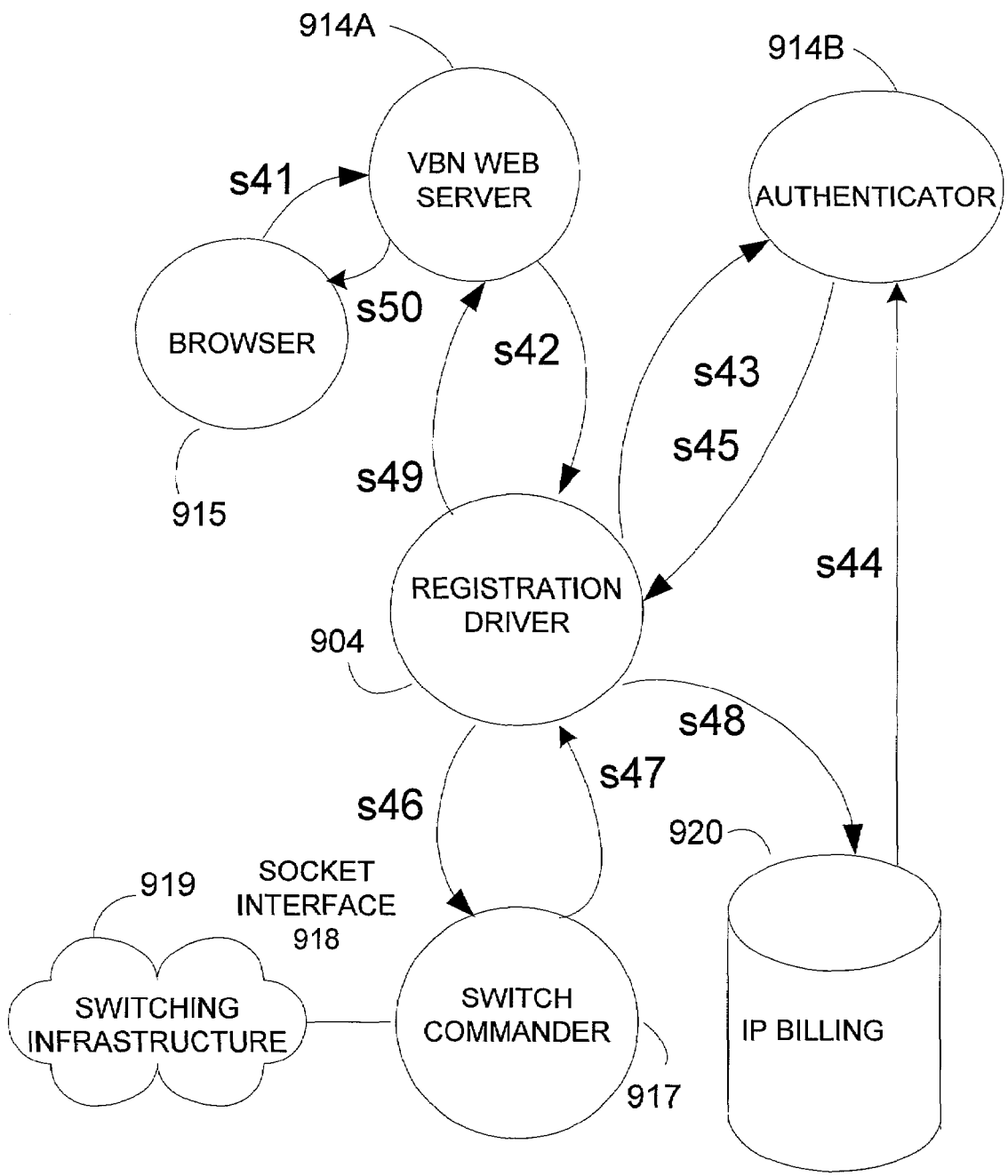
FIG. 6 shows an example of VLAN Group Administration (Delete VLAN Group) processing according to the first embodiment.

FIG. 6 shows the process for deleting VLAN group. It is noted that "an Open VLAN VLID" is the default VLAN in which an unregistered port is placed.

Step s41: The Client/Browser 915 sends data including room number, group name, administration command (Delete VLAN Group), and administration password to the VBN Web Server 914A.

Step s42: The VBN Web Server 914A passes the data to the Registration Driver 904.

Step s43: VLAN group name and administration password are sent to the Authenticator 914B for validation.

Step s44: The Authenticator 914B queries IP Billing database 920 to determining if the VLAN group name and administration password match.

Step s45: If a match occurred, the Authenticator 914B will send an authenticated response to the Registration Driver 904.

Step s46; Upon receiving the authenticated response, the Registration Driver 904 will send a "Delete VLAN Group" request to the Switch Commander 917. The request will specify the VLAN group VLID and request the administrator's port be removed from the definition and set back to an Open VLAN VLID so that the software tags an unregistered user's port as being a member in the Open VLAN (e.g. VLAN ID=2).

Step s47: On command completion, the Switch Commander 917 will report command status to the Registration Driver 904.

Step s48: If the command was successful, the Registration Driver 904 will remove the VLAN group definition including group name, administration password, user password and administrator's room number from IP Billing database 920.

Step s49: Delete VLAN group command status is returned to the VBN Web Server 914A.

Step s50: The VBN Web Server 914A reports successful or unsuccessful status back to the Client.

It will be understood by those skilled in the art that IVLAN may also execute on any UNIX type operating systems.

The functions of the VBN Server 901 are applicable to the following Internet access server described in U.S. patent application Ser. No. 09/742,006 (Referred to as SolutionIP server/SolutionIPTM server). The SolutionIP server will be described with reference to FIGS. 7-14.

A preferred implementation of SolutionIP™ is for the hotel industry. The primary objective is to provide guests with the ability to log into the Internet from their hotel rooms without having to modify their personal computer network settings. The guests will be able to transparently and seamlessly get their email, surf the web, etc. as if they were in their offices.

Usage Scenario

Figure 7:
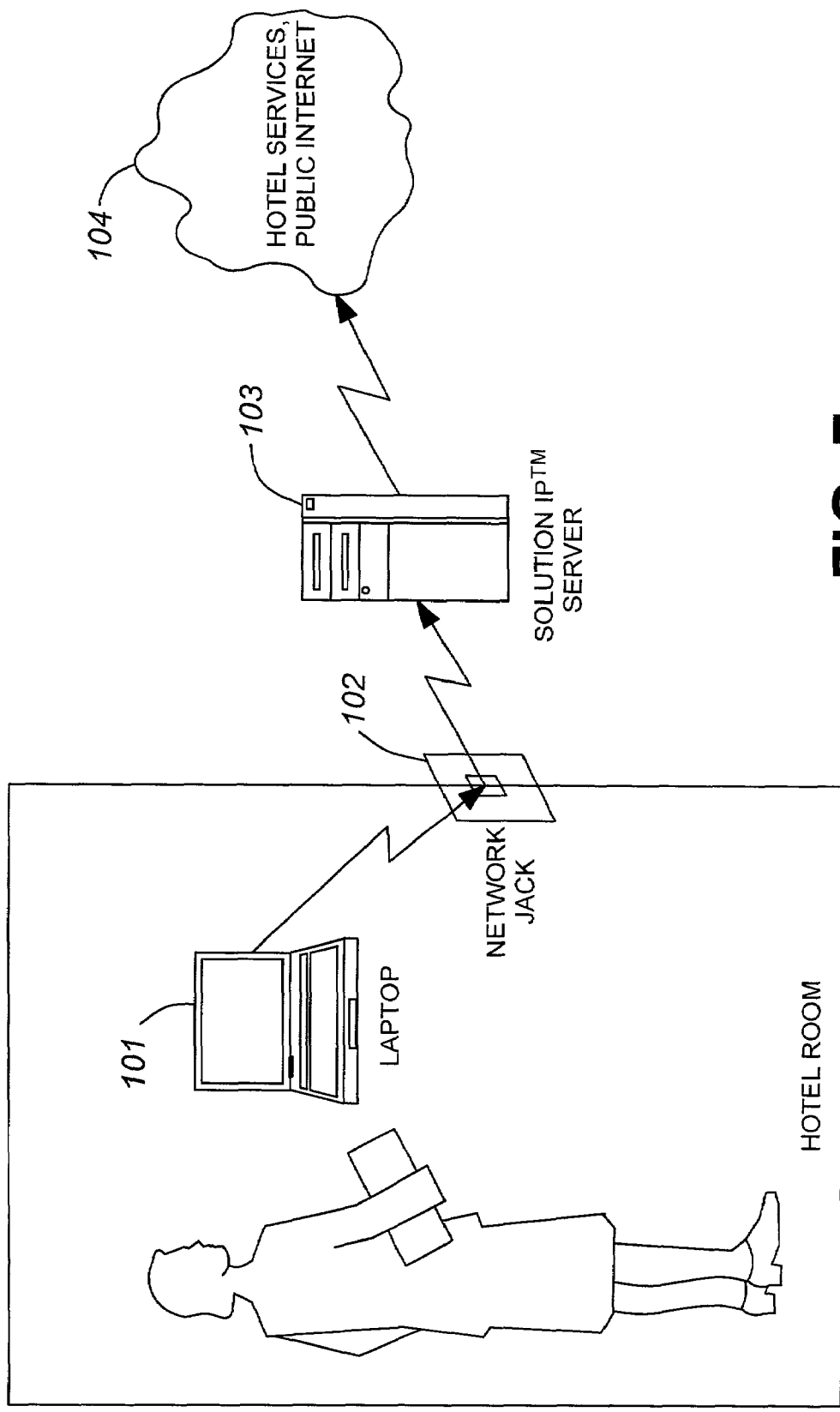
FIG. 7 is a pictorial representation of a typical server connection in a hotel environment.

A typical usage scenario for the SolutionIP™ invention is shown in FIG. 7 and consists of a business traveler requiring access to her companies email server from their hotel room. After connecting her laptop 101 to the hotel room's network jack 102 and registering for the SolutionIP™ service, the hotel guest can access the Internet, as well as online hotel services 104 (eg. Virtual Concierge) using the high-speed Internet connection of the hotel. She can then connect to the company email server via the Internet at speeds much higher than possible using a dial-up network connection. The server 103 provides the seamless and transparent connectivity.

SolutionIP™ is a server-based solution designed to allow users to connect a computer with a working Ethernet Network Interface Card (NIC) and an IP-based network configuration to the Internet. The guests physically connect to the SolutionIP™ system via a network interface connection. Most users will have seamless connectivity, however there are limitations, which are described in detail below.

Users are required to register with the system using a browser application before Internet connectivity is established. The server will detect all attempts at gaining access to the Internet and continue to redirect users to a SolutionIP™ web site until registration is completed. Once registered, they will be able to use the high-speed Internet connection of the hotel to access corporate computing resources and email via the Internet, browse the World Wide Web (WWW), etc.

Guests attempting to pop (read or download) their email before registration are issued an email message. The message simply asks them to register using their browser before email can be downloaded.

Functional Overview

SolutionIP™ translates network traffic from client (hotel guest) computers in such a way that it can be properly routed to and from the client via the hotel Internet connection. This is possible regardless of the current network settings (IP address, DNS servers, gateway, etc.) on the client machine, provided that the existing configuration is functional. (i.e. The client machine must have a working network configuration, although the actual addresses used are not expected to be configured for the hotel's network). SolutionIP™ transparently translates the settings of the client machine into addresses appropriate to the hotel's network environment while routing data to the Internet. In addition, the server "reverse translates" return network traffic to use addresses compatible with the client computer's configuration.

More specifically, only IP-based protocols are currently supported. Other types of network traffic are ignored and not forwarded by SolutionIP™. SolutionIP™ provides DHCP (Dynamic Host Configuration Protocol) server functionality, which is used to supply configuration data to those clients configured to dynamically obtain their network settings. DNS (Domain Name Service) requests are intercepted by SolutionIP™ (based on destination port number) and serviced locally by a DNS server running in the hotel. Outbound network traffic is intercepted by the SolutionIP™ server, which acts as a gateway to the Internet and forwards the data as appropriate. SolutionIP™ will pretend it is the client's gateway, even if the client has specified a different gateway, such as the one normally used by the client in the office.

Unauthorized use of the network (i.e. network traffic from clients who have not registered for the network service) is blocked by SolutionIP™ until the client registers. SolutionIP™ maintains a list of those client computers that have been registered and are authorized to use the network. Traffic from authorized clients is routed, while other traffic is discarded or redirected.

Figure 8:
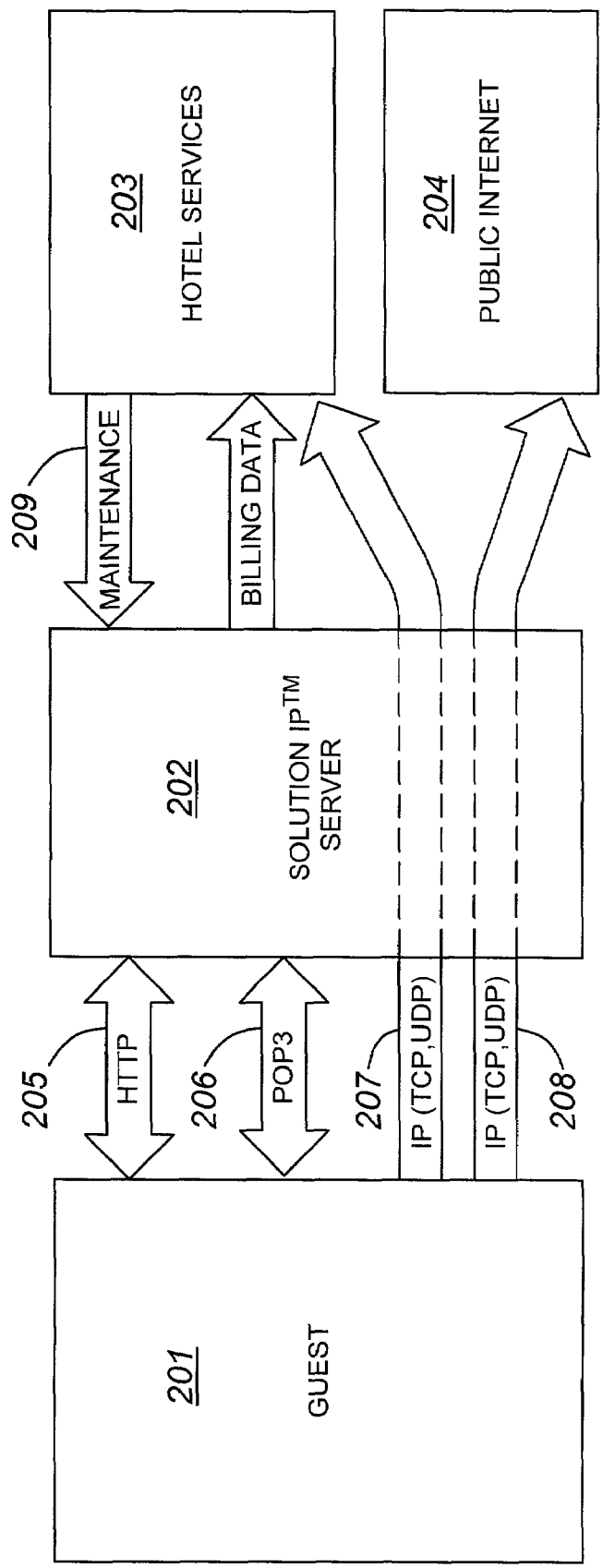
FIG. 8 shows a functional block diagram of FIG. 7.

FIG. 8 provides a functional block diagram of the invention in a typical hotel application.

The guest 201 connects to the hotel network and the SolutionIP™ server 202 carries out the appropriate functions to handle browser traffic 205 (HTTP), email 206 (POP3), hotel services traffic (207) (IP(TCP, UDP)) and Internet traffic 208 (IP(TCP,UDP)). The server 202 also provides a facility to handle maintenance traffic 209 from hotel services. Billing data 210 is collected and maintained in the server and supplied to hotel services as required.

A guest can communicate with the SolutionIP™ server via Hypertext Transfer Protocol (HTTP) requests 205 (the protocol used to access the WWW), or email requests 206 (POP3). Once registered, IP-based traffic originating from the guest's computer passes through the SolutionIP™ server to the Hotel Services Intranet 203 or to the Public Internet 204.

In general, the SolutionIP™ solution is not directly involved with attempts to secure the hotel network from external threats. Creating and enforcing a security policy for the Internet connection of the hotel is to be dealt with by other components of the overall solution. SolutionIP™ does not perform filtering of in-bound network traffic destined for registered clients.

The SolutionIP™ server has unnecessary services disabled and file permissions checked to try to prevent malicious modifications. The only login access to a SolutionIP™ server is by secure shell (SSH), serial connection or from the console.

Registration and Usage Component

The registration component is a web-based application, which allows hotel guests to register for the network service, as well as log off from it. It is accessible to all guests who are connected to the network (i.e. access to the registration site is not blocked by SolutionIP™). The web server for the registration component can run on a separate machine from SolutionIP™ minimizing the load on SolutionIP™.

Prior to registration for the network service, any attempts to access WWW and POP3 (a type of email) servers are detected by SolutionIP™ and intercepted. This is based on the TCP port number. These requests are answered by SolutionIP™ or forwarded to the web server where information is provided on how to register for the hotel network service. Although this embodiment is specifically POP3 other email protocols could be included.

SolutionIP™ also has the ability to track registration information, which can be used for billing purposes. Currently this information is available through an administration web site that displays who is connected to the network, who is registered, time and date of registration, etc. The server could implement a feature to track data volumes.

Client Requirements

Although the system is a server-only solution and transparent to registered clients, there are certain minimum requirements for client computers. SolutionIP™ is designed to operate without modifications to the client's computer configuration in the majority of cases, but certain components must be present and working. A utility could enable certain systems to access the network if the client does not meet the minimum requirements.

Minimum client requirements are:

Ethernet Network Interface Card installed and configured, with compatible interface to hotel network jacks;

Installed TCP/IP stack, configured for DHCP or for static IP address, gateway, and DNS server(s); and Web browser configured for direct network access (i.e. not a dial-up-only browser configuration and without proxies enabled). (Only required for registration/log-off process and The requirements described in this document are sufficient to allow the majority of clients to connect easily to the Internet via hotel networking facilities. However, some clients will have system configurations that will not allow connectivity through the SolutionIP™ server.

High Level Design

SolutionIP™ provides transparent network access via two mechanisms:

Network Address Translation (NAT): Each internal system is given a unique IP address to communicate with the Internet. This allows external connections to clients and facilitates UDP based protocols as well, but will require that a sufficient set of routable IP numbers be available for assignment at each installation.

Masquerading: Each internal system appears to the outside world with the IP address of the server. This requires special protocol-aware handlers (proxies) for protocols like active-mode FTP which try to create independent return connections back to the client, and also modifications are made to support UDP "connections" (state full packet inspection).

SolutionIP™ utilizes NAT as the primary mechanism for providing transparent network access. Despite the problems associated with IP number allocation this choice offers the best available mechanism to effectively deal with various unsupported network protocols. The preferred embodiment of the invention is based on a customized version of the Lanes operating system.

There are two main scenarios:

The client is configured to use a particular, fixed IP configuration. The server captures Address Resolution Protocol (ARP) requests from the client and the server responds with its own Media Access Control (MAC) address. The client is assigned an IP address, which is mapped to the client's configured IP address and its MAC address. If the client has not "registered" for the service, then any attempts to communicate with a web server or a pop server will result in a redirection to the registration screen (web) or a mail message with directions to the registration screen. Once they have registered, the client logs off the registration system, their traffic is allowed to proceed unimpeded. As the traffic passes through the server, the IP address of the client is translated back and forth between the configured (fixed) IP address and the server-assigned IP address.

The client uses DHCP. In this case SolutionIP™'s DHCP server component assigns an IP address and then SolutionIP™ acts simply as a router, except that normal IP traffic is blocked or redirected until the client goes through the registration process.

Core Server Components and Interactions

Figure 9:
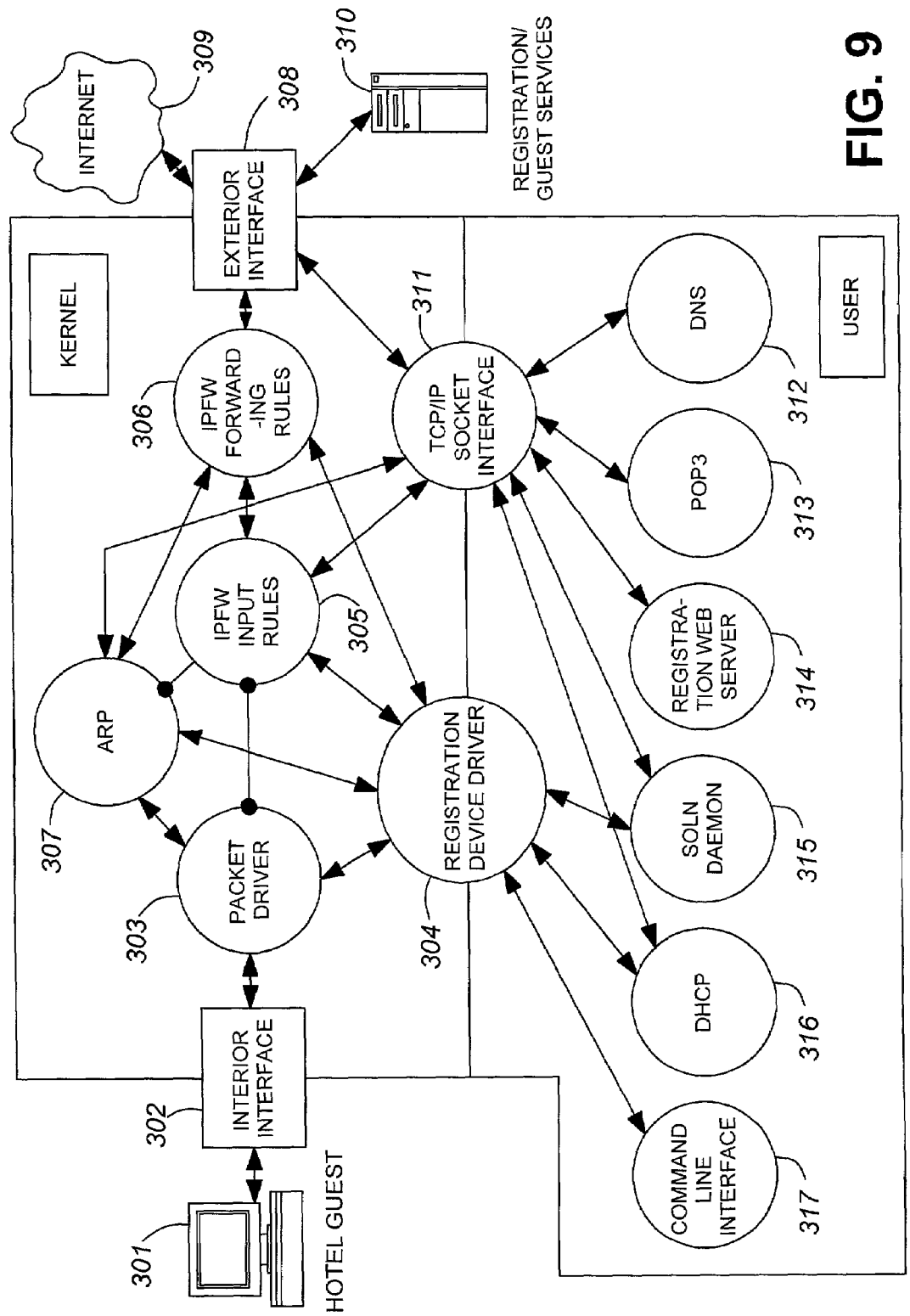
FIG. 9 shows an example of the core components and interactions of the server shown in FIG. 7.

FIG. 9 shows the breakdown of the core components of the invention and their interactions. These components are further described below.

ARP

The ARP module 307 of the server uses ARP which is a standard networking protocol the behaviour of which is described below.

ARP (Address Resolution Protocol) (See RFC-826 (RFC stands for Request For Comment and is the standard way of asking for comments on standards and other aspects of Internet operation via the Internet. A website that is useful in accessing the various RFCs is www-.faqs.com)for the protocol specification) is intended to provide a method for one machine to obtain the MAC (Media Access Control) Address of a system for which they know the IP address.

Typically, a machine will determine that the machine that they wish to communicate with is on the same local network by comparing the IP address of the target machine with their own IP address information. If the machine they want to communicate with is on the same network, currently there is no association between the IP address of the target system and a MAC address then the machine will make an ARP request for the target machine's IP address. If the target machine is active, it should be watching for ARP requests and if the IP address specified in the ARP request matches the IP address of the target machine it will respond to the ARP request.

The address resolution protocol is a protocol used by the Internet Protocol (IP) network layer protocol to map IP network addresses to the hardware addresses used by a data link protocol. This protocol is used below the network layer as a part of the OSI link layer, and is used when IP is used over Ethernet.

The term address resolution refers to the process of finding an address of a computer in a network. The address is "resolved" using a protocol in which a piece of information is sent by a client process executing on the local computer to a server process executing on a remote computer. The information received by the server allows the server to uniquely identify the network system for which the address was required and therefore to provide the required address. The address resolution procedure is completed when the client receives a response from the server containing the required address.

Proxy-ARP (See RFC-1009 for a description) is a variation on the ARP protocol where a router (a system with more than one interface that routes packets between networks on or through the networks on each interface) will respond to ARP requests for systems on one interface made by systems on an other interface with it's own MAC address. This is done to support situations where it is necessary or expedient to split a network without sub-netting or where machines not capable of understanding sub-nets have to reside on sub-netted networks.

SolutionIP modifies the standard behaviors described above on an interface-by-interface basis by promiscuously responding to ARP requests. This is an extension to Proxy-ARP. In general, any ARP request is responded to by the SolutionIP Server with the SolutionIP Server's MAC address regardless of the IP address being requested, with the following exceptions:

1. Microsoft windows and some other OSs, while booting, will send an ARP request for the IP address that their interface is configured for, and if they receive a response they will shut down that interface and not attempt any network activity. This is a test to ensure that the IP address to be used by the system is unique and avoid conflicts. These test packets have unique characteristics that allow the SolutionIP server to recognize them and not respond to these requests.

2. If the ARP request is for a system for which the SolutionIP server has an entry in the registration driver, then it is left up to that system to respond rather than the SolutionIP Server.

3. In the case where the SolutionIP Server needs the MAC address for an IP address it will first determine if an entry exists in the registration driver and if it does use that MAC address rather than sending an ARP request.

This allows the SolutionIP server to pretend to be the gateway (default router), DNS Server, etc. for clients using fixed IP configurations. In addition, the server avoids delays when communicating with systems on its client networks by using the registration driver rather than making ARP requests.

Registration Device Driver (Sometimes Referred to as Soln Device)

The registration device driver 304 is a pseudo driver in that it is not actually associated with any physical device but rather the device is the registration data that is stored and managed by this driver. The registration information maintained by the driver includes:

Original IP—this is the original IP address that the client used when communicating with the server. Under certain circumstances, it may be equal to the assigned IP address. A fixed IP configured client will have the IP address for which the client is configured. For a DHCP configured client this will usually be zero or the IP address that the client was assigned on its previous network or it will equal the assigned IP address.

Assigned IP—this is the IP address assigned to the client by the registration server. This will be a number chosen from the available IP addresses in the address ranges that the driver is configured to support. An IP address is always assigned to each new MAC address as it is encountered. If the original IP address is equal to an unassigned IP address that the driver has been configured to support then that IP address will be assigned, otherwise the next available IP address will be offered.

MAC address—this is the MAC address of the client system.

Creation Time—is the time that the IP address was assigned to this MAC, this happens when the first packet is received from the client.

Registration Time—is the time that the client was registered (for Internet access) by going through the registration process for that site.

Registration Expiry—is the time that the registration is due to expire (lose Internet access).

Entry Expiry—is the time that the assigned IP address will be returned to the pool of free IP addresses.

Last Used—the last time there was traffic to/from the client system.

Flags—used to contain bit fields used to indicate the state and nature of a particular client (i.e. registered; DHCP; valid; permanent; no expiry; etc.)

This information is accessed and manipulated by other kernel drivers and processes through function calls defined in Registration Device Driver 304. User space applications access and manipulate the registration information with the standard Lanes device interface and the associated ioctl calls. Entries can be looked up using original IP, MAC, or Assigned IP addresses. All characteristics of an entry can be manipulated, although not all directly, an entry can be marked as registered and the driver will assign the appropriate registration expiry time. Certain attempts to look up an entry will result in an entry being assigned if an existing entry can not be found, specifically the soln_get_aip_mac call will cause an IP address to be assigned to the specified MAC address if an existing entry can not be found. A complete dump of the current state of the driver can be obtained by opening and reading the device. Likewise, this information can be used to initialize the driver by opening the device and writing the same (or similar) information back into the device. This gives us the ability to backup and restore the current state of the driver thus minimizing the effects of reboots on registered clients. In addition to the information described above the state information for the driver includes:

How often the driver's current time is updated (time granularity).

How often to run the purge algorithm that looks for registered entries to expire and to for unregistered entries to be purged.

What the default expiry mode is for the system this can include one of the following:

0. NO_EXPIRY—where no entry is ever expired automatically.
1. RELATIVE_OFFSET_EXPIRY—where entries are expired a fixed amount of time relative to the time that they registered.
2. TIMEOFDAY_EXPIRY—where entries are expired at a particular time of day regardless of when they registered.

The expiry period is either the time offset for the relative offset mode or the time of day for the time of day mode depending on the expiry mode chosen.

The time of day grace period, this is used to determine if the second time of day expiry should be used rather than the next. In other words if the time of day expiry time is 11:00 am and the grace period is ½ hour then if someone registers between 10:30 am and 11:00 am they will actually be registered until the following day rather than just being registered for ½ hour or less.

The inactive timeout which is used to decide whether to expire a unregistered entry, in essence if activity has been detected for an entry within the inactive timeout period then the entry will not be purged.

The number of ranges available for assignment to clients.

The range data, each range is specified by a starting IP address and an ending IP address the IP addresses must be of the form A.B.C.x and A.B.C.y where $0<=x<=y<=255$. Thus each range may consist of up to 256 entries, this allows multiple ranges to specify a network larger than a class C subnet.

In addition to externally triggered events, the registration driver has certain automatic activities that it performs on a regular (configurable) basis:

If the current time is older than the registration expiry time of an entry then the driver will unregister that entry, unless that entry is marked as no expiry.

If the current time is older than the entry expiry time of an entry then the driver will purge that entry (return the assigned IP to the pool of available assigned IP addresses) unless the entry is marked as permanent.

The registration driver updates its concept of what the current time is.

TCP/IP Socket Interface

The TCP/IP Socket Interface (311) is the standard socket networking interface provided by Linux, Unix, and many other operating systems that provide networking services.

Command Line Interface/Soln Daemon

The Command Line Interface 317 offers an administrative and diagnostic tool to system administrators. It serves as a user space interface into the registration driver. It has options for most of the Registration Driver's ioctls. It can be used to check the current state of the registration driver 304 or modify it.

The Soln Daemon 315 shares the same code base as the Command Line Interface 317 and thus shares much the same functionality. It is launched from the Command Line Interface using a command line parameter that forces it to run as a daemon. As a daemon, it has several special functions. It is responsible for performing regular periodic backups of the registration driver. It also listens for UDP traffic on a specified port. This facilitates most of the registration and administrative requirements of the web based interface. It is also able to communicate with Solsnmpd (a module for carrying out network management) and retrieves information as required during a registration request.

IPFW/ipfwadm/Packet Filter Rules

The packet filter module 305,306 allows packet filter rules that test the state of the registration entry flags for the source and/or destination addresses of packets, these tests include:

tests for whether the address is a valid entry or not (i.e. is it in a valid range and has it been assigned to a MAC address);

tests for whether the address is a DHCP entry or not; and tests for whether the address is registered or not.

Ipfwadm, the standard Linux utility for defining the packet filter rules in the kernel at run-time has been modified to set and interpret the new tests as specified above.

Packet filter rules are defined to provide the following functionality:
- unregistered clients' POP requests are redirected to the SolutionIP custom POP server;
- unregistered clients' HTTP requests are redirected to the redirection web server 314 that is configured to redirect requests to the registration web server 310.
- All clients' DNS requests are redirected to the local DNS server 312.
- All other unregistered clients' requests are blocked.
- All registered clients' SMTP requests are redirected to the local SMTP server not shown).
- Where unroutable addresses are used for clients the filters can be configured to perform masquerading or NAPT (Network Address Port Translation).
- Other filters can be configured to provide security for the SolutionIP server or to block client access to specific arbitrary protocols.

Packet Drivers

The packet drivers 303 have enhanced functionality over the standard Linux protocol handlers at the point where the generic packet handlers interface with the hardware specific Ethernet drivers. This additional functionality is selectable on a per-interface basis.

On an enabled interface, all incoming packets are examined, and their MAC looked up in the registration driver. If the packet is an IP or ARP packet then the MAC is looked up in the registration driver, if this is the first time that this MAC is encountered then an IP address is assigned and if the source IP address of the packet is a valid unassigned IP address then that IP address will be assigned to that MAC address. Once the assigned IP address is determined, sanity tests are applied to ensure that the original IP address associated with the MAC has not changed in an unacceptable manner, if it has changed in an unacceptable manner then the entry is deleted, thus forcing the client to re-register if they were previously registered. If the assigned IP address is different from the original IP address in the client's packet then that IP address will be replaced with the assigned IP address in the IP or ARP header and the packet checksum recalculated according to the methods described in RFC-1624. If the packet contains a TCP or UDP packet then the checksum is further recalculated as above to account for the changed IP address in the pseudo-header associated with such packets as described in section 3.3 of RFC-1631.

All outgoing packets on an enabled interface have their source destination address looked up in the registration driver (as an assigned IP address). If a matching entry is found then the original IP address is substituted provided it is non-zero and not equal to the current destination address. Then the packet's checksums are recalculated as described above for incoming packets.

DHCP Server

A modified DHCP server 316 has been included in SolutionIP to provide IP addresses to clients requesting IP information based on the assigned IP address provided by the registration device driver 304 for that client's MAC address. Additionally the DHCP server 316 has been modified to provide leases based on the inactivity timeout as obtained from the driver.

Pop Server

A modified POP server 313 is provided to:
- accept any username and password combination;
- ignore all mailbox-modifying commands; and
- present a special mailbox with a single new site-specific message as the only available mail. The intention of this message is to direct the user to use their web browser to access the web so they can register for the service.

Normally POP (a request to read or download mail from the client's email server) requests from clients would only be directed to this server if the client is attempting to access their e-mail without being registered.

SMTP Server

A MTA (Mail Transfer Agent) has been configured to:

Act as a mail gateway for clients. Many sites configure their mail servers to block outsiders from sending mail through them to another site. This is a security precaution against spammers using a site as a relay. We redirect all clients SMTP traffic to our local server so clients will be able to send mail as necessary.

The SMTP server (not shown on FIG. 9) is configured to block relaying attempts using the SolutionIP server.

Redirection Web Server (solhttpd)

The firewall rules redirect all unregistered traffic on port 80 (http) to a special port on the SolutionIP server. The solhttpd daemon is a web server 314 configured to listen for http traffic on a special port. When it receives an http request, it is configured to rewrite the URL such that it will send the client to the Registration WEB Server 310. This means that any unregistered client who launches their standard web browser will be redirected to the Registration WEB Server instead of their intended destination.

Registration Web Server

The Registration WEB Server (310) is a web server that serves local content for the SolutionIP server. This includes the Registration WEB pages, Administrative WEB pages, and Configuration WEB pages.

Registration/Administration/Configuration Web Pages

The Registration WEB pages serve as a client's gateway to SolutionIP services. This includes registering for access to the Internet. The client can choose between two different methods of authentication, port based or access code based. In the port based authentication model, a client's room and fee information is determined based upon their assigned IP address (facilitated by Solsnmpd). In access code based authentication, clients can enter access codes that map them to a particular room number and fee.

In addition to the registration side, there is also an administrative set of pages. These pages allow server administrators and staff to perform various tasks. These include:
- the checking the current state of the registration driver;
- manual registration changes;
- modification of registration driver settings;
- modification of Soln Daemon setting's;
- display system health variables;
- display of billing information; and,
- the display and generation of access codes.

The registration WEB pages use the Soln Daemon (315) to communicate with the Registration Driver and Solsnmpd to facilitate administration and the registration process.

Also provided are several first generation web based configuration tools. Primarily, these are designed as middleware to insulate the users from the database.

Billing Database (ipbilling)

A standard open source relational DBMS (database management system) implements a schema designed to support the billing process. The schema allows flexible configuration of the system and includes the following:

site configuration information;
fee information;
network infrastructure and associated mappings, including room to port mappings and other switch-related information;
billing and usage information; and
access Codes.

DNS Server

A standard open-source DNS server 312 is provided to all clients to handle their DNS requests. There is nothing special about this server; rather what is special is that all client DNS requests are directed to this server. This ensures that no client (static or DHCP) will have its DNS requests timeout because the DNS server is either inaccessible (behind a firewall) or too far away (too many network hops) to respond in a timely manner.

Solsnmpd

This server uses a proprietary protocol to accept requests and return results. Request and response packet formats are defined as needed for each query. The purpose of this daemon is to handle communications with switches and other network devices on the client network using Simple Network Management Protocol (SNMP) to achieve various ends. The initial functionality for this daemon is to accept requests to determine at which "physical port" a client is connected. The daemon is sent a request containing the MAC address of the client. The daemon then uses the switch hierarchy as defined in the billing database to walk through the switches using the Bridge MIB (RFC-1493) to determine the what port the client is connected through. Once the switch and port are determined then the "physical port" can be derived, again using the billing database. This information is returned to the requesting process.

Solsyncd

This server (not shown in FIG. 9) extracts configuration information from the billing database and places it in flat (text) configuration files to allow access of the configuration information without accessing the database. If the resulting configuration files have changed then a HUP signal will be sent to specific processes so they will re-read their configuration files and get the updated data.

Process Monitor (keepalive)

This script is run every minute and is configured to check the status of several daemons on the server, complain if they are not running and if they continue to not run for a configurable length of time they are restarted.

Server Configuration Tool (reconfig-all.pl)

This tool takes a per-site configuration file and applies it to a hierarchy of template configuration files to configure the server for a particular site.

From the above description is recognized that not all components have been shown of FIG. 9 but a person skilled in the art would understand how the functionality described by the components not shown would be integrated into the system. It can be seen from the above description that the term server is used both to refer to a computer running the programs to achieve the desired functionality and to software modules themselves that carry out the desired functionality. It is understood that there is a continuum of structure and various aspects of the invention can be carried out by hardware, firmware or software, or a combination, as may be desired.

Server Processing

The following sections describe various processing carried out by the server in general terms.

DHCP Request Processing

Figure 10:
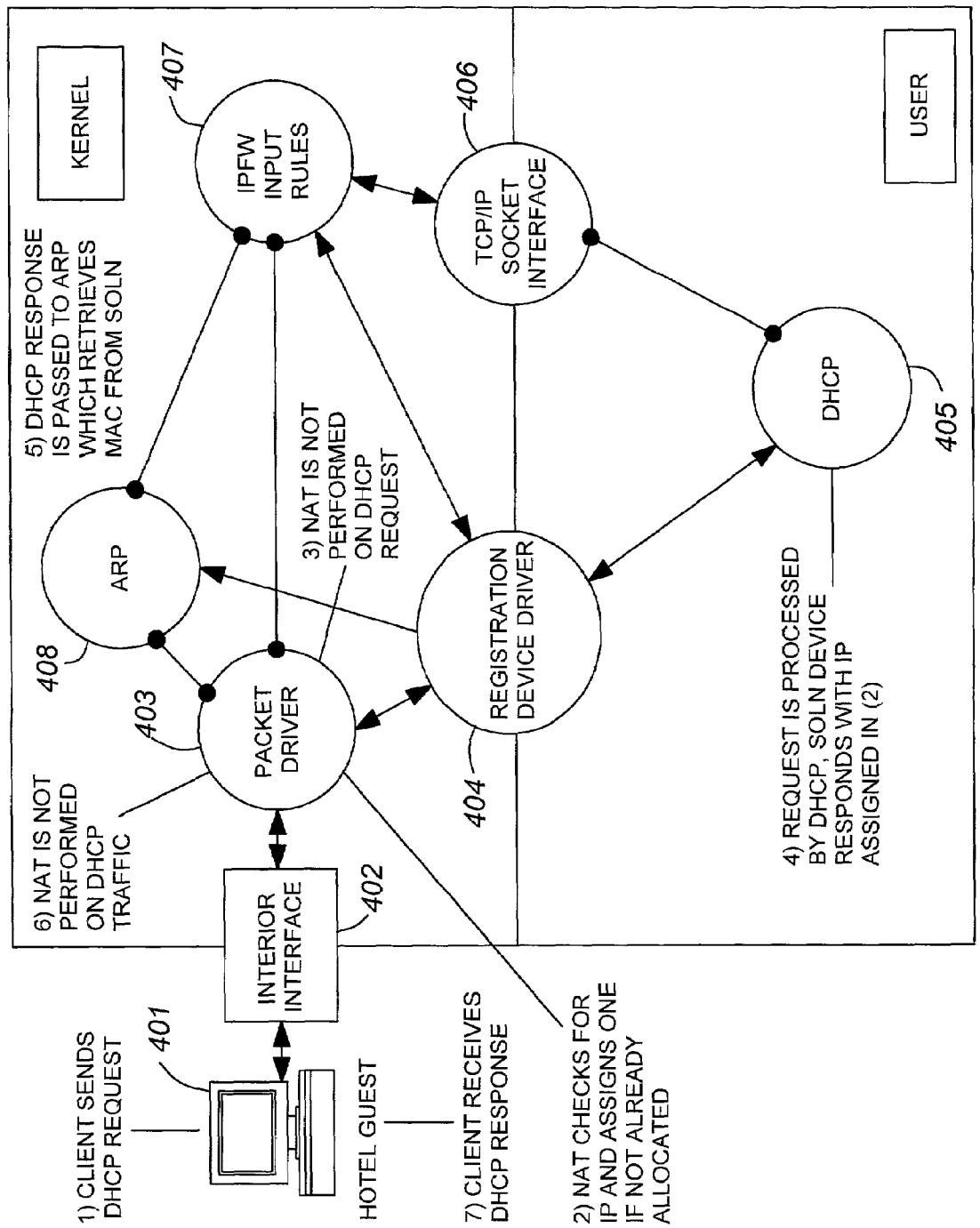
FIG. 10 shows an example of DHCP request processing.

The processing performed by SolutionIP™ for DHCP requests is described below in reference to FIG. 10.

When a guest with a computer configured for DHCP powers on, the computer 401 initiates a DHCP request to the other computers on the LAN. The modified DHCP server 405 receives and processes that request. The DHCP server 405 captures the MAC address of the guest computer 401 and initiates a request for an IP address to the Registration Device Driver 404. The Registration Device Driver provides an appropriate IP address for the guest. The IP address is returned to the DHCP server, which then passes the address and any additional parameters (gateway to use, DNS server to use, etc.) back to the guest's computer.

ARP Request Processing

Figure 11:
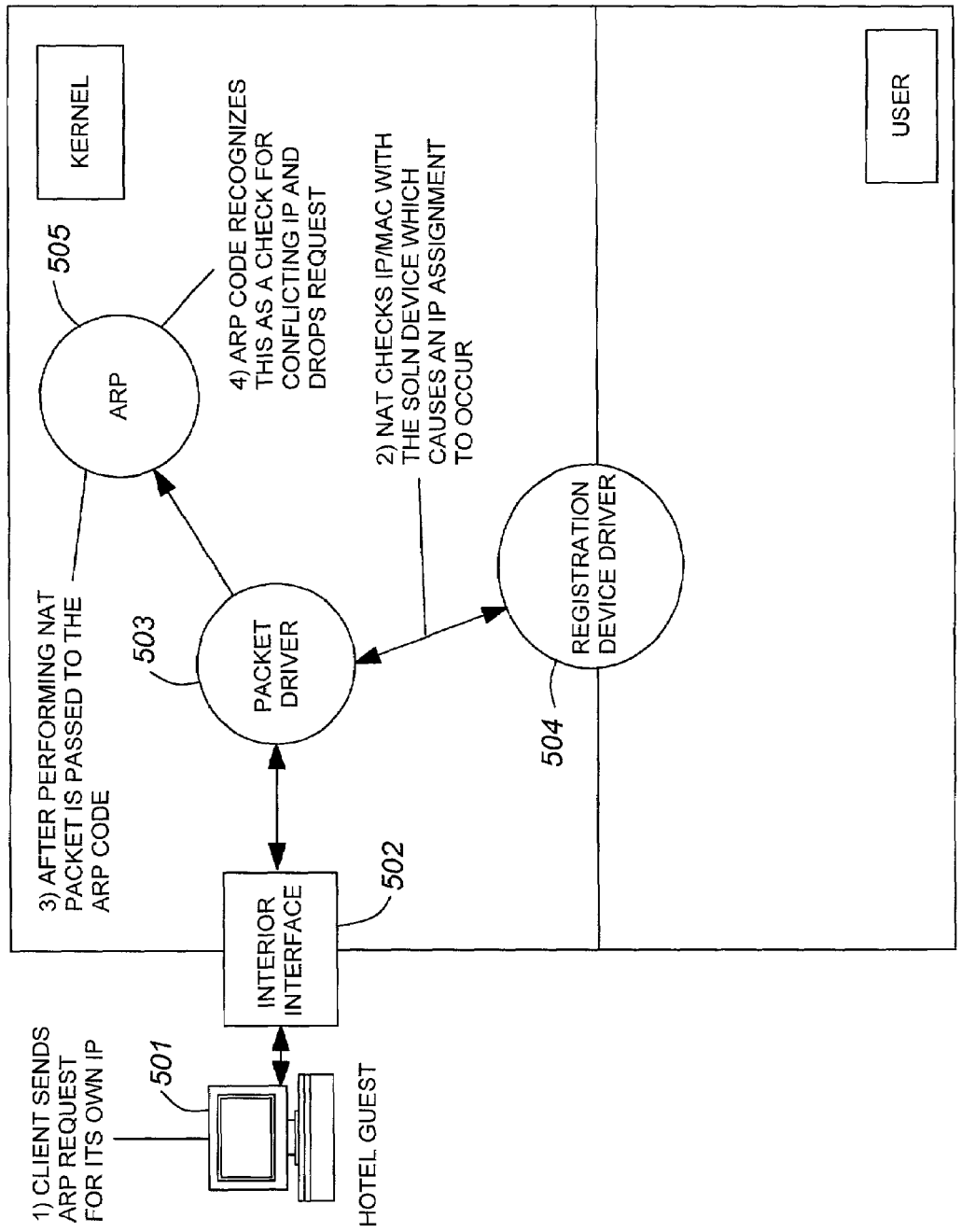
FIG. 11 shows an example of ARP request processing.

The processing performed for an ARP request is described with reference to FIG. 11, below.

To identify exactly which machine on a LAN has a particular IP address, a guest's computer 501 initiates an ARP request, asking for the MAC address of the machine having the specified IP address. The Registration Device Driver 504 detects the ARP request and responds with its own MAC address via the ARP server 505, regardless of the IP address actually requested. While processing the ARP request, the ARP server 505 will notify the Registration Device Driver 504 of the guest computer's MAC address and IP address. The Registration Device Driver 504 can then determine if a matching MAC address and IP address pair exists, as well as whether NAT will be required for the guest computer. The Registration Device Driver 504 will then update its data structures with the new information if necessary.

Unregistered HTTP Request Processing

Figure 12:
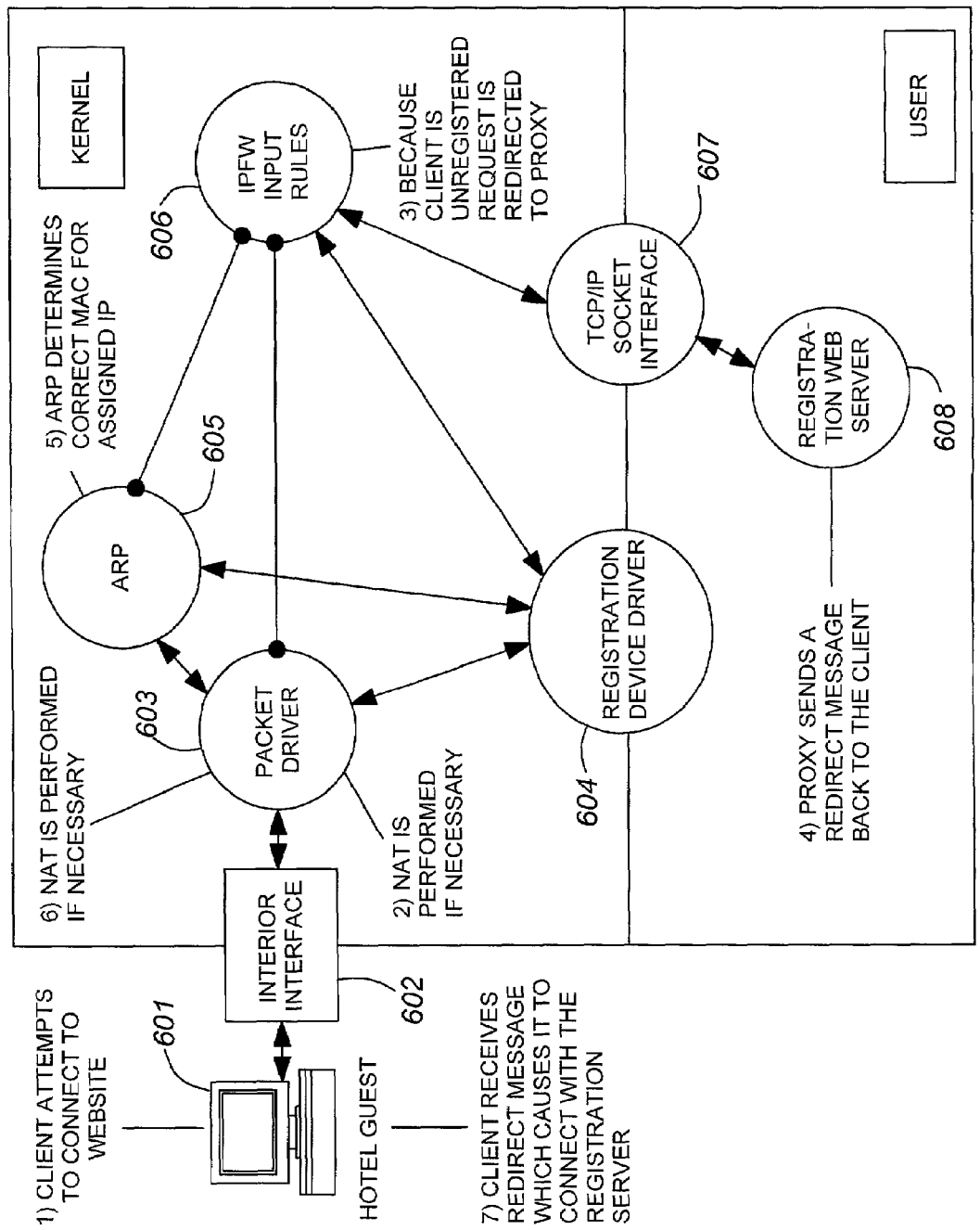
FIG. 12 shows an example of unregistered HTTP request processing.

Processing of HTTP requests involves redirecting unregistered guests to the registration web server, and allowing requests from registered guests to be routed normally. Processing of unregistered HTTP requests is described as shown in FIG. 12.

Processing of a Hypertext Transfer Protocol (HTTP) request begins with receipt of the request by SolutionIP™'s packet drivers 603. These drivers query the Registration Device Driver 604 to identify whether NAT translation of the packet headers is required. If required, the packet drivers 603 perform this translation. The IPFW component 606 is then given control of the request. It queries the Registration Device Driver 604 to determine whether the guest is registered. If the guest is registered, it allows the request to be routed normally. If the guest is not registered, the request is passed to the Redirection Web Server 608, which translates it into a request for the registration area of the Registration Web Server. The translated request is then submitted to the Registration Web Server and the guest is presented with the hotel's registration screen. If the guest chooses to register for the network access service, this information is provided to the Control Program/Daemon, which updates the Registration Device Driver appropriately. Subsequent requests from the guest computer following the update of the Registration Device Driver will be processed as from a registered guest.

Registered HTTP Request Processing

Figure 13:
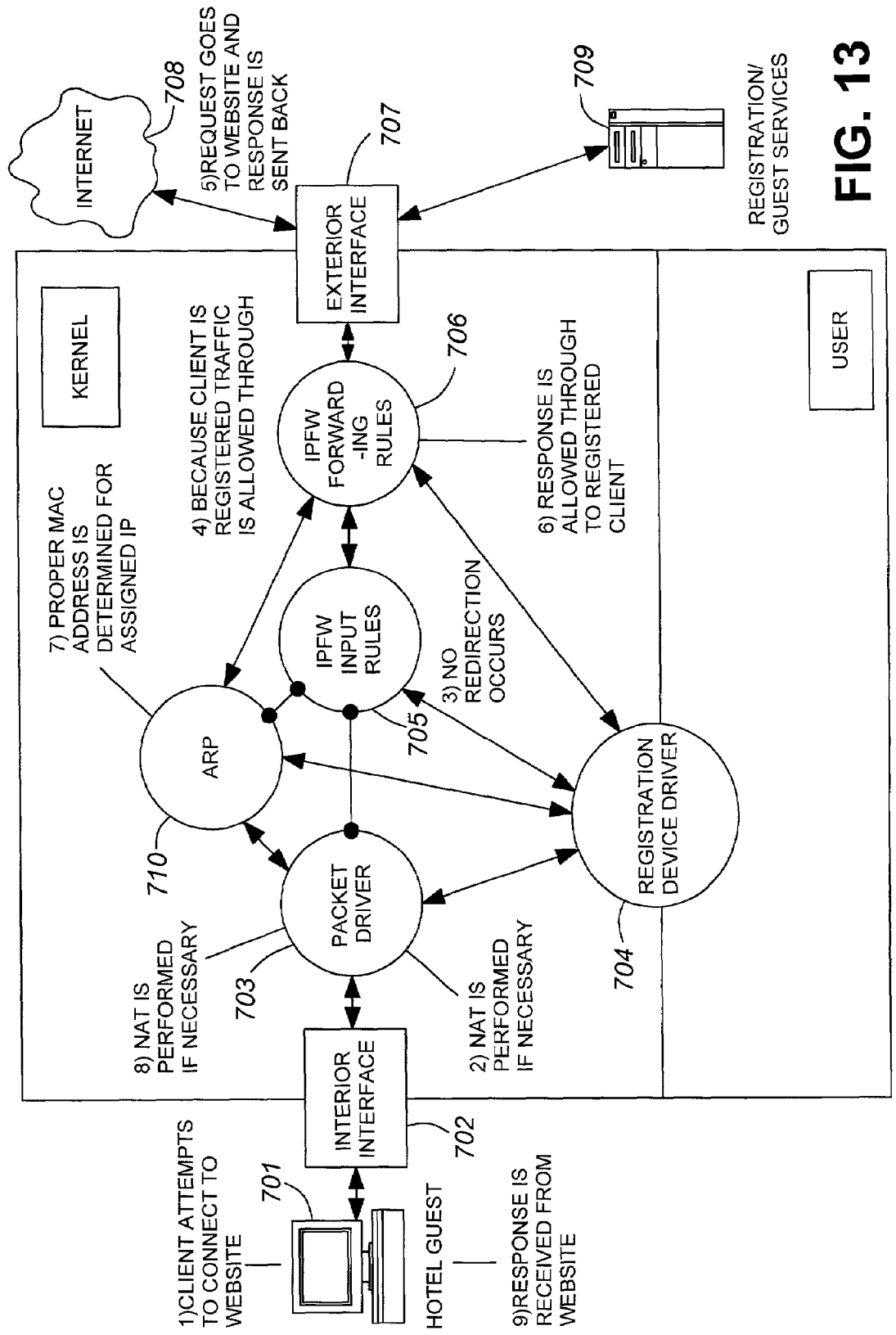
FIG. 13 shows an example of registered HTTP request processing.

The following description is made in reference to FIG. 13. The general processing performed by the SolutionIP™ server for IP-based traffic other than web and email traffic is the same as shown in FIGS. 12 and 13 except that it is not subject to redirection. IP-based traffic initiates from the guest's computer 701 and is sent to the SolutionIP™ server. The packet drivers 703 on the SolutionIP™ server then determine whether the traffic requires NAT and performs translation on the headers if so required. The IPFW packet filter 705,706 then determines whether the guest has registered for the network access service. If the guest is registered, the data traffic is allowed to proceed and is routed normally. If the guest has not registered, the data is blocked by discarding the incoming network packets.

Billing Aspect of Invention

The following section describes the components and functionality of the billing aspect of the server and method invention.

The billing aspect of the invention has two methods of registration, access codes and port identification. Access codes are generated for each room on a daily basis. Clients must enter the access code for their room as part of the registration process. Port identification will automatically determine the client's room number by querying the network switch infrastructure to determine the specific switch port from which the client is connected. Switch ports will be mapped to specific rooms. Access codes can be used in the event the client is not connecting from a guestroom, such as when working from a public area in the hotel, or if the switch port cannot be determined.

Authorization codes are used as an override mechanism to apply special processing rules (discounts, free usage, etc.) to particular clients. The system stores and displays the authorization code as part of the billing report. The interpretation and application of authorization codes is the responsibility of hotel staff.

The hotel Property Management System (PMS) performs the actual billing of clients. The billing system provides web-based reports which can be printed and manually entered in the PMS by hotel staff.

Requirements

SolutionIP requires two Pentium class systems operating at 200 MHz or greater. One functions as the SolutionIP server while the other hosts the web site and database. These machines require the following hardware:
64 MB RAM;
4.5 GB hard drive;
Network Interface Card (NIC) (Linux compatible)
  NOTE: The SolutionIP server requires two NICs and the web server requires one;
Monitor and keyboard are optional; and
Two serial ports.
The client component has the following requirements:
Network Interface Card and connector;
Web browser;
TCP/IP stack; and
A printer connection will be required for billing reports.
SolutionIP supports a variety of client operating systems including Win95, Win98, WinNT, MacIntosh OS 8 and Linux.
The switches for port identification must support:
Bridge MIP (RFC 1493);
SNMP read access; and
1-1 mapping (room to port).
The software requirements are based on the functionality of each machine:
SolutionIP Server:
Operating System—RedHat Linux 5.1.
SolutionIP Web/Database Server:
Operating System—RedHat Linux 5.1;
Web Server—Apache;
Database—PostgreSQL 6.4 or higher; and
Per 5.004.

It is understood that the aforementioned components are for the preferred embodiment. A person skilled in the art would recognize that other components could be used without departing from the invention.

Areas of Functionality

Three main areas of functionality exist for the billing system. These include port identification, access code generation and interpretation, and billing system administration. This section presents an overview of the general requirements of the system, as well as the specific requirements for each of the areas of functionality.

Overview of Billing

Billing begins with the identification of the room associated with each client. Rooms are identified either manually by associating an access code with a particular room, or automatically by obtaining the switch port the client is connected to and deriving the associated room. The system provides facilities to automatically generate a new access code for each room, either for the current day or the next day. The codes are displayed via a web page and can be printed. A configurable history of access codes is maintained to prevent duplicate codes from being generated within the history period. No mechanism is provided to prevent access codes from being used more than once or by more than one client. Each new MAC registering is billed to the associated room. Registrations will be valid until the next checkout time. The access code is used to determine which room to bill, and so it will be the responsibility of the client to ensure that the code is kept secure. Billing is based on the room from which the client registers when using port identification.

Once the room is identified, the fee associated with that room will be determined. A flat fee per day will be associated with each room (different rates can be charged for different rooms). The registration interface allows clients to enter special authorization codes. These codes will be stored with the client's billing information. Authorization codes used will be included in the billing report generated for hotel staff, but will not actually affect the fee generated by the billing system. Interpretation and application of authorization codes will be the responsibility of the hotel staff.

A web-based billing report is provided and printed by the hotel staff. It displays who has been online since the last checkout time. Additional queries for arbitrary dates is also available. These show who was online from checkout time on the specified day until checkout time the next day. Information included in the report includes client room, registration time, access code, port, authorization code, and fee. Access to all administrative web reports are password protected.

The database is capable of storing one month's worth of data. Backup, restoration, and disaster recovery procedures can be provided.

Port Identification

One method of associating a client (MAC Address) with a Room for billing purposes is Port Identification. If, on registration, the physical port connection can be identified as being associated with a room, then that client's registration will be billed to that room. To determine what physical port a client is connected to the Simple Network Management Protocol (SNMP) is used to discover which switch port they are talking to, static data tables are then used to determine the room number.

The switch/port number that a MAC is using is determined by using SNMP to search the installation's switches.

Mapping from the switch/port number that a MAC appears on identifies physical ports. This mapping is maintained in the database. Physical ports map to room numbers and billing rates. These mappings are maintained in the database.

The determination of the MAC to physical port mapping is done on an as required basis.

If port identification is available it takes precedence over access code identification and no access code is requested of the user during the registration process. The exception to this are physical ports flagged as requiring a valid access code for registration to succeed.

Access Code Identification

An alternative to Port Identification is Access Code Identification. Each access code is associated with a particular room and will be valid for a limited time period (usually one day from checkout time to checkout time). If port identification fails or is not available on a given port then the client will be prompted for an access code which the system then validates. This will ensure that a billing record is generated for the appropriate room.

Administrative Features

This section of the specification describes the administrative features related to billing. The administrative features serve as the interface between the billing system and the hotel staff. The two main components are the billing and access code reports.

Billing Report

The billing report provides information to the hotel staff regarding room numbers, access codes, authorization codes, physical ports, registration time and fees. The report is web-based and viewable from a standard web browser. The hotel staff are able to generate and view the report on an as-needed basis.

Access Code Generation and Report

The access code report provides hotel staff with the information related to room numbers and access codes. The report is web-based and viewable from a standard web browser. The hotel staff are able to generate and view the report on an as-needed basis. Upon reviewing a report, the system automatically generates access codes for the current or the following day if they do not exist in the database.

Functional Components

Figure 14:
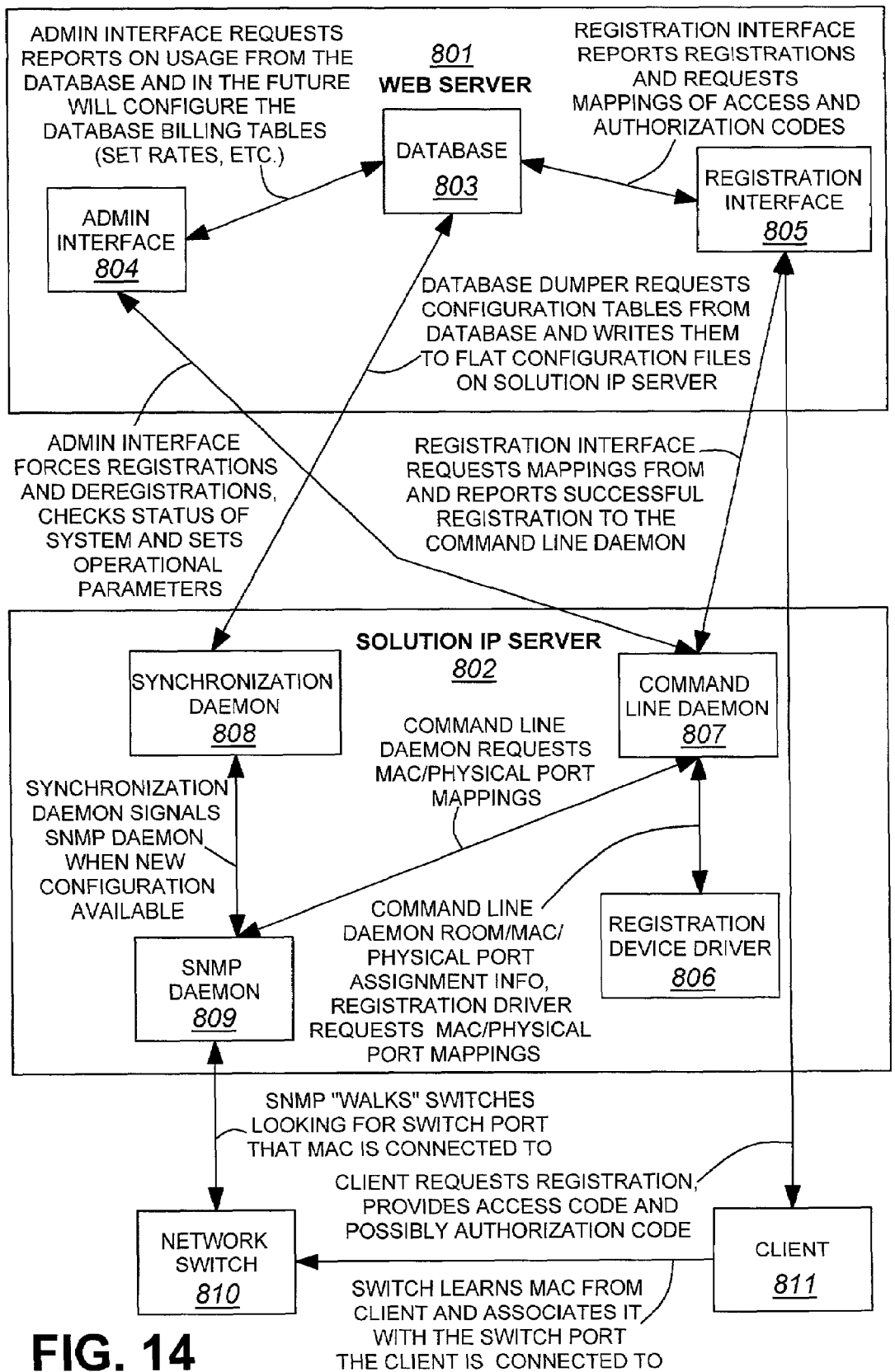
FIG. 14 shows billing components and interactions.

The following section describes the functional components of the billing system and refers to FIG. 14. It is to be understood that the preferred embodiment here described uses two computers acting as servers but a person skilled in the art would understand that one server could be used or more than two could be used without departing from the invention.

Overview

The billing system consists of components running on both the SolutionIP Server 802 and the Web Server 801. The Web Server hosts the billing and configuration database 803, the Admin Interface 804 which will be part of the Admin web site and the Registration Interface 805 which will be the existing Registration Web pages with modifications to accommodate the new billing system methods. On the SolutionIP Server the Registration Driver 806 and Command Line Daemon 807 accommodates the new billing system methods. The Synchronization Daemon 808 and the SNMP Daemon 809, are implemented to support the billing system.

Database

The Billing System in the preferred embodiment is implemented using a PostgreSQL 6.4 database. The database stores configuration information, access codes, and billing records. One month of data will be maintained at any given time. Data older than one month will be regularly purged from the database. Database backup and recovery procedures can be provided. required.

Configuration data handled by the database includes switch configuration information (switch addresses, types, mappings of switch ports to rooms, etc.). Hotel checkout time, amount of data history to maintain, and other related parameters will also be stored in the database.

The database stores the access code and its effective dates for each room. By default, each code will only be effective for one day. A history of access codes for each room is kept. New codes are checked against this history to prevent duplication.

Billing records identify the room to be billed for each connection. The following fields will be included in this record:

room number;
port registered from;
access code used;
authorization code;
registration date and time; and
type of fee to be charged.

In certain cases, some fields may be NULL. For example, the access code would normally be NULL when port identification is being used.

Command Line Daemon

The daemon has the ability to handle multiple simultaneous requests from other systems, preserve parameter changes and track the state of registration driver backups. The daemon also accommodates the use of the SNMP 809 and Synchronization daemon 808.

Registration Device Driver Interface Functions

The Command Line Daemon 807 is the primary interface into the registration device driver 806. The functionality of the registration device driver accommodates the billing system.

The command line daemon supports the following operations:

set the original room and port id for a specified user;
set the current room and port id for a specified user;
block a specified user, so they can not register;
unblock a specified user, so they can register;
flag a specified entry as permanent;
flag a specified entry as no longer permanent; and
set a grace period (time period prior to checkout, during which registrations will not expire until checkout time the next day).

Interface to SNMP Daemon

The billing system communicates with the SNMP Daemon 809 via the Command Line Daemon 807. The Command Line Daemon 807 channels all traffic between the other billing system components and the SNMP Daemon. The Command Line Daemon also updates the Registration Device Driver 806, where applicable, with the results received from the SNMP Daemon.

The command line daemon:
responds to requests for port id resolution from both the registration server and kernel drivers;
forwards requests for port id resolution to the SNMP Daemon;
receives port ids back from the SNMP Daemon;
passes port id information back to requestor; and
informs the kernel of port id information if the kernel was not the requester of the transaction.

SNMP Daemon

The purpose of the SNMP Daemon 809 is to resolve MAC addresses to their physical port number, or return an error if this is not possible. This Daemon uses SNMP to interrogate the network switches to find the switch port that the client is connected to and then use static data tables to map that switch port to a physical port number. For this component:
configuration data is obtained from flat data files stored on the SolutionIP Server;
configuration data files will be derived from database tables and updated by the Synchronization Daemon;
when Configuration files are changed the SNMP Daemon will be informed by the Synchronization Daemon; and
requests and responses are handled through standard Interprocess Communication Methods to other components on the system.

Registration Device Driver

The Registration Device Driver supports billing and production requirements. The driver maintains information on client MAC addresses, original IP addresses, and assigned IP addresses. Timing parameters are included to allow fixed-length registration periods, as well as inactivity timeouts for unregistered clients. A Time of Day expiry mode is included. The method of expiration will be determined at the time of client registration. Under the Time of Day expiry mode, registrations will expire at the next checkout time (or any arbitrary time each day). Currently new registrations are expired at the end of a fixed time interval, typically 24 hours. The Time of Day expiry mode is more consistent with normal hotel billing routines. The existing expiry calculation mode will be preserved as an option.

In addition to the new expiry mode, the ability to override parameters for individual clients is available. Existing driver parameters serve as defaults, and affect all clients. An overide mechanism allows administrators to change specific parameters on a client-by-client basis. An example might be to extend the expiry time of a particular client, without affecting the expiry times of other clients.

In addition to operating on MAC and IP address information, the driver includes and operates on room and port data. The work of associating rooms and ports with clients in the driver is performed by external components (the billing system and SNMP daemon). Operations supported by the driver, such as registering or deleting entries, allow such operations to be performed on all clients associated with a particular room or port.

Production requirements include the ability to reserve specific addresses or make entries permanent. This allows support maintenance access to network devices, such as switches, which reside on the client side of the servers. A mechanism to block particular clients is also implemented. This mechanism identifies clients by room, port, or MAC. Blocked clients are able to access the registration server and other services available to unregistered guests, but they are prevented from registering for full system access.

Synchronization Daemon

The purpose of the Synchronization Daemon 808 is to centralize access to the database by components of the SolutionIP Server through one interface. The daemon uses information stored in the database to create flat configuration files on the SolutionIP server. This allows configuration information for the various components to be centralized in the database but does not preclude their being maintained on the server if a database is not available or required at a particular installation.

When files are updated by the Synchronization Daemon, the processes that use them are informed that an update is available (methods of communicating this include signals, IPC semaphores or having the process monitor the last modified time of its configuration files). It is also possible to have this process update information in the database based on status files from the SolutionIP server.

Web Server Registration Process

The registration process takes advantage of the billing system methods. When a client attempts to register, the system first attempts to determine if they are connecting from a room that allows billing via the port identification method. If a billable room is identified using this method then the user will be presented with the Authorization Confirmation Screen. If a billable room cannot be identified using the Port Identification Method then the Access Code Identification method will be used. The user will be presented with an access code entry screen, when the user enters a valid access code then the billable room will have been identified and they will be presented with the Authorization—Confirmation Screen. The Authorization—Confirmation Screen will present the user with the room number and rate and any other important information. The user will also be given the opportunity to enter an optional Authorization Code. Once the user confirms their willingness to pay the specified rate they will then be taken to The Virtual Concierge. This allows one to access a variety of services offered through the hotel as well as the www and email.

Particular User Examples

To better understand the operation of the invention a number of specific examples follow that explain in detail the steps carried out by the invention in order to achieve the results desired in the particular scenarios set out.

Client Startup

System Startup
Scenario: Client boots their computer.

Fixed IP
Scenario: Client is configured with a fixed IP configuration.
1. Client turns system on.
2. System generates an ARP request to see if its IP address is already in use.
3. SolutionIP server picks up the ARP request and passes it to the Packet Driver.
4. The Packet Driver asks the Registration Driver to look up the Assigned IP address for the MAC of the packet.
5. The Registration Driver, not able to find an entry for that MAC assigns a new IP address from the pool of available IP addresses.
6. The Packet Driver performs NAT on the ARP packet (as necessary).
7. The Packet is passed on to the ARP handler.
8. The ARP Handler sees that the Source IP address is Equal to the Destination IP address and drops the ARP request.

9. Eventually the client times out and assumes that it is the soul owner of that IP address on its network.

DHCP

Scenario: Client is configured for DHCP.
1. Client computer makes a DHCP DISCOVER request.
2. This request is intercepted by the packet driver who asks the registration driver for the assigned IP address for this MAC.
3. The registration driver will attempt to lookup the assigned IP address for the MAC and if it not found create a new assignment based on its pool of free addresses.
4. The packet driver will NAT the request as required and forward it to the DHCP server.
5. The DHCP server will lookup the assigned IP address for the MAC address and return a DHCP OFFER response for that address.
6. The ARP handler looks up the MAC address for the destination address from the Registration Driver and inserts that MAC address into the packet.
7. The packet driver will intercept the response and perform NAT if required.
8. The user's DHCP client will respond with a DHCP REQUEST for the assigned IP address.
9. The packet driver will intercept the request, perform NAT if required and forward the request to the DHCP server.
10. The DHCP server will lookup the assigned IP address for the MAC address and return a DHCP ACK response for that address.
11. The ARP handler looks up the MAC address for the destination address from the Registration Driver and inserts that MAC address into the packet.
12. The packet driver will intercept the response and perform NAT if required.
13. The client obtains the IP address.

Browser Startup

Scenario: Client starts their WEB browser, and attempts to load a WEB page.
1. Client starts WEB browser.
2. Browser needs to look up the IP address of the WEB server so it generates a DNS request.
3. SolutionIP server picks up the DNS request and passes it to the Packet Driver.
4. The Packet Driver asks the Registration Driver to look up the Assigned IP address for the MAC of the packet.
5. The Registration Driver returns the AIP to the Packet Driver.
6. The Packet Driver performs NAT, if necessary.
7. The packet is passed on to the Packet Filter that redirects the request to the SolutionIP DNS server.
8. The DNS server looks up the HTTP server and creates a response for the client.
9. The response packet goes to the ARP handler that asks the Registration Driver to look up the MAC address for the client and then the ARP handler adds it to the outgoing packet.
10. The packet is then passed to the Packet Driver that looks up the Original IP address for the Assigned IP address and performs NAT if necessary.
11. The response is sent back to the client.
12. The client will generate an ARP request for their gateway server (assuming that the IP address returned for the HTTP server was not local, if it is local then the client will be requesting the MAC of the HTTP server instead).
13. The SolutionIP server will pick up the ARP request and pass it to the Packet Driver.
14. The Packet Driver will ask the Registration Driver to look up the Assigned IP address for the MAC of the packet.
15. The Registration Driver will return the AIP to the Packet Driver.
16. The Packet Driver will perform NAT as necessary.
17. The ARP request is passed on to the ARP handler
18. The ARP handler generates a response saying that the SolutionIP server's MAC is the MAC for the requested IP address.
19. The ARP response is passed back to the Packet Driver.
20. The Packet driver looks up the OIP of the packet destination using the AIP and performs NAT if necessary.
21. The ARP response is sent back to the client.
22. The Client then sends a HTTP request to the IP address returned by the DNS to the MAC address returned by the ARP response.
23. The HTTP request arrives at the SolutionIP server and is passed to the Packet Driver.
24. The Packet Driver gets the Registration Driver to look up the AIP for the MAC and performs NAT if necessary.
25. The Packet is Passed to the Packet Filter which determines that the client is unregistered
26. The Packet is redirected to the Redirection Web Server (solhttpd).
27. The Packet is redirected to the Registration Web Server.
28. The Registration Web Server generates the response to the HTTP request.
29. The Packet is passed back to the ARP Handler that looks up the MAC associated with the AIP of the client and updates the packet.
30. The Packet is passed back to the Packet Driver that looks up the OIP associated with the AIP and performs NAT if necessary.
31. The response is passed back to the client.

The conversation will continue from here but the form will be similar to the above.

Client Registration

Scenario: having been redirected to the Registration Web Page, the client then registers for the service.

Port Based

Scenario: the client is plugged into a switch port on which port-based authentication has been configured.
1. The client accesses the registration web page that triggers the execution of a CGI script.
2. The CGI checks the database and determines that port-based authentication has been configured.
3. The CGI requests the MAC address and physical port information for the assigned IP address from Soln Daemon.
4. Soln Daemon asks the registration driver for the MAC address associated with the assigned IP address given.
5. The registration driver returns the MAC address associated with the assigned IP address.
6. Soln Daemon asks Solsnmpd for the physical port number associated with the given MAC address.
7. Solsmnpd returns the physical port information after resolving the port based upon the given MAC address.
8. Soln Daemon returns the MAC address and physical port information based upon the assigned IP address given.
9. The CGI requests room number and fee information from the database for the physical port number.
10. The database returns the room number and fee information for the physical port given.

11. The CGI dynamically generates HTML for the client that reflects the room and fee information returned from the database.
12. The client chooses to accept the fees and continue with registration.
13. The CGI requests registration for the assigned IP address from the Soln Daemon.
14. The Soln Daemon asks the driver to register the entry with the given assigned IP address.
15. The CGI inserts the client's information into the database and forces the portal page to the client.

Access Code
Scenario: the client is plugged into a switch port on which port based authentication has not been configured and access codes are enabled on this installation.
1. The client accesses the registration web page that triggers the execution of a CGI script.
2. The CGI checks the database and determines that port based authentication has not been configured and access codes are enabled.
3. The CGI dynamically generates HTML for the client that reflects need for them to enter access code information.
4. The client enters access code information into the form.
5. The CGI requests the room number and fee information from the database for the given access code.
6. The database returns the room number and fee information for the given access code.
7. The CGI dynamically generates HTML for the client that reflects the room and fee information returned from the database.
8. The client chooses to accept the fees and continue with registration.
9. The CGI requests registration for the assigned IP address from the Soln Daemon.
10. The Soln Daemon asks the driver to register the entry with the given assigned IP address.
11. The CGI inserts the client's information into the database and forces the portal page to the client.

Automatic
Scenario: the server has been configured to automatically register new clients. The main effect here is that clients are always directed to the portal page the first time they access the WEB.
1. The client is redirected to the registration web page that triggers the execution of a CGI script.
2. The CGI requests registration for the assigned IP address from the Soln Daemon.
3. The Soln Daemon asks the driver to register the entry with the given assigned IP address.
4. The CGI forces the portal page to the client.

Client E-Mail

Registered

Sending
Scenario: A registered client is attempting to send an e-mail using their e-mail client software (Netscape, Outlook, Pegasus, etc.)
1. The client sends the e-mail using their preferred client software and configured outgoing SMTP mail server.
2. Mail client looks up SMTP server's IP address using DNS.
3. Mail client looks up the MAC address of either the SMTP server or their gateway using ARP.
4. The Packet Filter transparently redirects all SMTP traffic for registered clients to the local SMTP server.
5. The SMTP server acts as a proxy and sends the e-mail on behalf of the client.

Unregistered

Popping
Scenario: An unregistered client is attempting to pop their e-mail from their home system using their e-mail client software (Netscape, Outlook, Pegasus, etc.)
1. Client looks up POP server's IP address using DNS.
2. Mail client looks up the MAC address of either the POP server or the gateway using ARP.
3. The Packet Filter transparently redirects all POP3 traffic for unregistered clients to the local POP3 server.
4. The POP3 server accepts any username and password combination and delivers a single new e-mail message to the client.
5. This e-mail typically informs the client that they have not registered for the service and instructs them how to do so.

Client Traffic (General)

DHCP
Scenario: A DHCP configured client sends and receives packets through the SolutionIP server.

Sending
1. Client generates a packet for a remote host routed through the SolutionIP Server.
2. SolutionIP Server receives the packet and passes it to the packet driver.
3. The packet driver examines the packet and looks up the AIP in the Registration Driver using the MAC address.
4. The packet driver determines that the AIP and the original Source address are equal and that NAT is not necessary.
5. The packet is passed to the packet filters see the Registered and Unregistered sections below.

Receiving
1. Packet is passed from the packet filters to the ARP handler.
2. The ARP handler will look up the MAC address of the destination host of this packet.
3. The packet will then be passed on to the packet driver that will look up the entry for the Assigned IP address and determine that no NAT is necessary.
4. The Packet will then be transmitted to the client.

NAT
Scenario: A Fixed IP configured client sends and received packets through the SolutionIP server.

Sending
1. Client generates a packet for a remote host routed through their gateway (however the SolutionIP server will claim to be that gateway when the client makes their ARP request)
2. The SolutionIP Server receives the packet and passes it to the packet driver
3. The packet driver examines the packet and looks up the AIP in the Registration Driver using the MAC address.
4. The packet driver determines that the AIP and the original Source address are not equal and that NAT is necessary.
5. The packet is NATed and passed on to the packet filters see the Registered and Unregistered sections below.

Receiving
1. Packet is passed from the packet filters to the ARP handler.
2. The ARP handler will look up the MAC address of the destination host of this packet.

3. The packet will then be passed on to the packet driver that will look up the entry for the Assigned IP address and determine that NAT is necessary.
4. The packet driver will perform NAT on the packet and transmit the packet to the client.

Registered

Routable

Scenario: Traffic from and to a registered client with a routable assigned IP address is received and sent by the SolutionIP server.

Sending
1. Packet is received by the packet filters.
2. It is determined that the packet can be forwarded.
3. Packet is forwarded out the appropriate external interface, through the appropriate router. (Usually there is only one external interface and one router)

Receiving
1. Packet is received by the external interface.
2. Packet is passed to the packet filters and it is determined that it may be forwarded.
3. Packet is passed on to the ARP handler to have the appropriate MAC added. (See the appropriate NAT or DHCP Receiving section above.)

Unroutable (Masqueraded)

Scenario: Traffic from and to a registered client with a unroutable assigned IP address is received and sent by the SolutionIP server which configured to masquerade the unroutable addresses.

Sending
1. Packet is received by the packet filters.
2. It is determined that the packet is to be masqueraded.
3. The packet filters assign a port on the SolutionIP server for the source port of this client.
4. The packet is transmitted NAPTed so it looks like it came from the SolutionIP server on the assigned port.

Receiving
1. Packet is received by the external interface
2. Packet is passed to the packet filters and it is determined that this port is a masqueraded port and the packet must be reverse NAPTed so it has the appropriate destination port and IP address.
3. The packet filters determine that the packet may be forwarded.
4. The packet is passed on to the ARP handler to have the appropriate MAC added. (See the appropriate NAT or DHCP Receiving section above.)

Unregistered

Unregistered client traffic in general is blocked by the SolutionIP server packet filter rules.

Client Expiry

Unregister

Scenario: A registered client has reached their registration expiry time.
1. The client is using various Internet services.
2. The Registration Device Driver (Soln Device) executes its purge function (NOTE: this happens on a configurable periodic schedule).
3. The purge function determines that the client's registration expiry time is less than the current time.
4. The purge function sets the entry to unregistered and calculates the entry expiry time (NOTE: the actual behavior depends on the expiry mode).
5. The Packet Filters allow any established connections to remain open.
6. The next http request initiated from the client as handled as previously described (see Browser Startup).

Purge

Scenario: An unregistered client has reached their entry expiry time, and they are inactive.
1. The client has disconnected from the network or otherwise become idle.
2. The Registration Device Driver executes its purge function.
3. The purge function determines that the client's entry expiry time (calculated as the last used time plus the inactivity grace period) is less than the current time.
4. The entry is deleted from the Registration Driver.
5. Any future traffic from the client will be handled as previously described (see Client Startup).

VLAN Services by the SolutionIP Server

Figure 15:
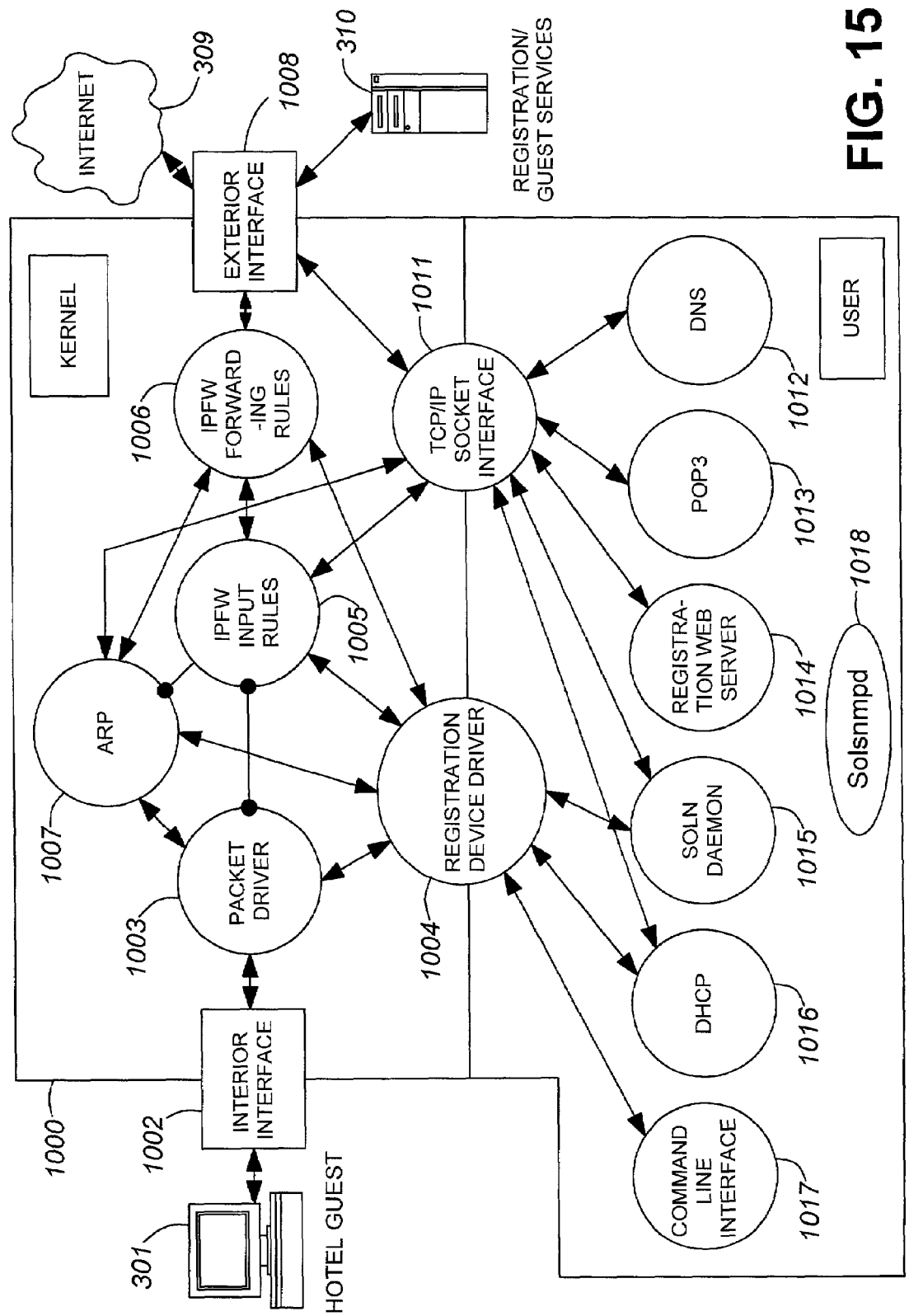
FIG. 15 shows an example of the VBN Server 1000 according to the first embodiment.

FIG. 15 shows an example of the VBN server according to the first embodiment. Referring to FIG. 15, the VBN Server 1000 comprises Packet Driver 1003, Registration Device Driver 1004, Registration WEB Server 1014 and Solsnmpd 1018.

The Packet Driver 1003 includes the functions of the Packet Drivers 303 and 903. The Registration Device Driver 1004 includes the functions of the Registration Device Drivers 304 and 904. The Registration WEB Server 1014 includes the functions of the the Registration WEB Servers 314 and 914. The Solsnmpd 1018 includes the functions of the Solsnmpd of the SolutionIP Server 202 and the Solsnmpd 905.

Interior interface 1002, IPFW Input Rules 1005, IPWF Forwarding Rules 1006, ARP 1007, Exterior Interface 1008, TCP/IP Socket Interface 1011, DNS 1012, POP3 1013, Soln Daemon 1015, DHCP 1016 and Command Line Interface 1017 are similar to Interior interface 302, IPFW Input Rules 305, IPWF Forwarding Rules 306, ARP 307, Exterior Interface 308, TCP/IP Socket Interface 311, DNS 312, POP3 313, Soln Demon 315, DHCP 316 and Command Line Interface 317 respectively. Client (Hotel guest) 301 is connected to the Interior interface 1002 via the core-leaf switches.

According to the aforementioned invention, user-to-server security is automatically provided using VLANs whose management is automated by the server. The server facilitates user initiated group collaboration by placing users requesting the service in the same VLAN. Additionally, the limit on the number of VLANs can be extended through creative use of the filtering policies on the switching infrastructure. Further, user-to-server security is provided by placing each individual user into separate VLANs. The server's automation and management of VLAN creation/deletion facilitate this process, which allows user to control groupings of users into common VLANs (i.e. group collaboration). Further, the filtering policies implemented on the switches allow users to utilize a broad range of VLANs.

Second Embodiment

An on-demand Routable IP address service according to a second embodiment will be described in detail with reference to the drawings. The reassignment of addresses is handled using a customized DHCP and minimal user intervention.

The main features of the on-demand routable IP address service comprise:

control of IP assignment by the VBN Server or the SolutionIP Server described above such that it can dynamically reassign IP addresses on demand.

RealIP

A preferred embodiment of the second aspect of the invention will be referred herein as RealIP.

RealIP is an Internet Protocol(IP) address allocation technology that enables a Dynamic Host Configuration (DHCP) Server to allocate both routable and non-routable IP addresses, initiated by the end-user.

IP addresses are utilized by devices communicating with the TCP/IP protocol (the communication protocol of the Internet) to determine the routing of network traffic to and from clients. Typically, network clients are configured either with a static IP address or to request the allocation of an IP address from a DHCP server.

When a client configured for DHCP is initially connected to a TCP/IP network, it issues a broadcast message requesting an IP address. Typically, the DHCP server will respond with an IP address allocated form a pool of addresses that it maintains. The DHCP server can maintain pools of both routable and non-routable addresses.

Routable and non-routable addresses differ fundamentally in that devices with non-routable addresses must initiate any communication. Devices with routable addresses may be contacted by other devices without first initiating the communication flow. The difference is of interest in the user of Visitor Based Networks (VBNs). A VBN is one in which clients connect for temporary access to network for Internet services.

A common implementation of a VBN is a hotel service in which guests may connect to a hotel gateway server for Internet access. Since the number of available routable IP addresses in this situation is typically smaller that the number of connections available to guests, a pool of non-routable IP addresses is generally utilized by the VBN DHCP server. However, this practice limits the capabilities that a guest has available from such a VBN connection. For example, a common use of digital communications is Net-Meeting (trade-mark), in which a number of participants may interact electronically through a NetMeeting server hosted by one of the participants. Without a routable IP address, the hotel guest is unable to host such a meeting for others who are participating via the Internet.

Overview

The RealIP system of the second embodiment allows a network client to request either a routable or non-routable IP address depending on the client need. The RealIP service executes on a variety of operating systems. The preferred embodiment is based on a Linux operating system.

The RealIP system according to the second embodiment comprises;

1. Common gateway Interface (CGI) component accessed via Hypertext Markup Language (HTML) pages;
2. Registration Driver incorporated into the VBN kernel; and
3. Custom built DHCP server. The following paragraphs describe in more detail the technology encapsulated by RealIP.

Components and Interactions

Figure 16:
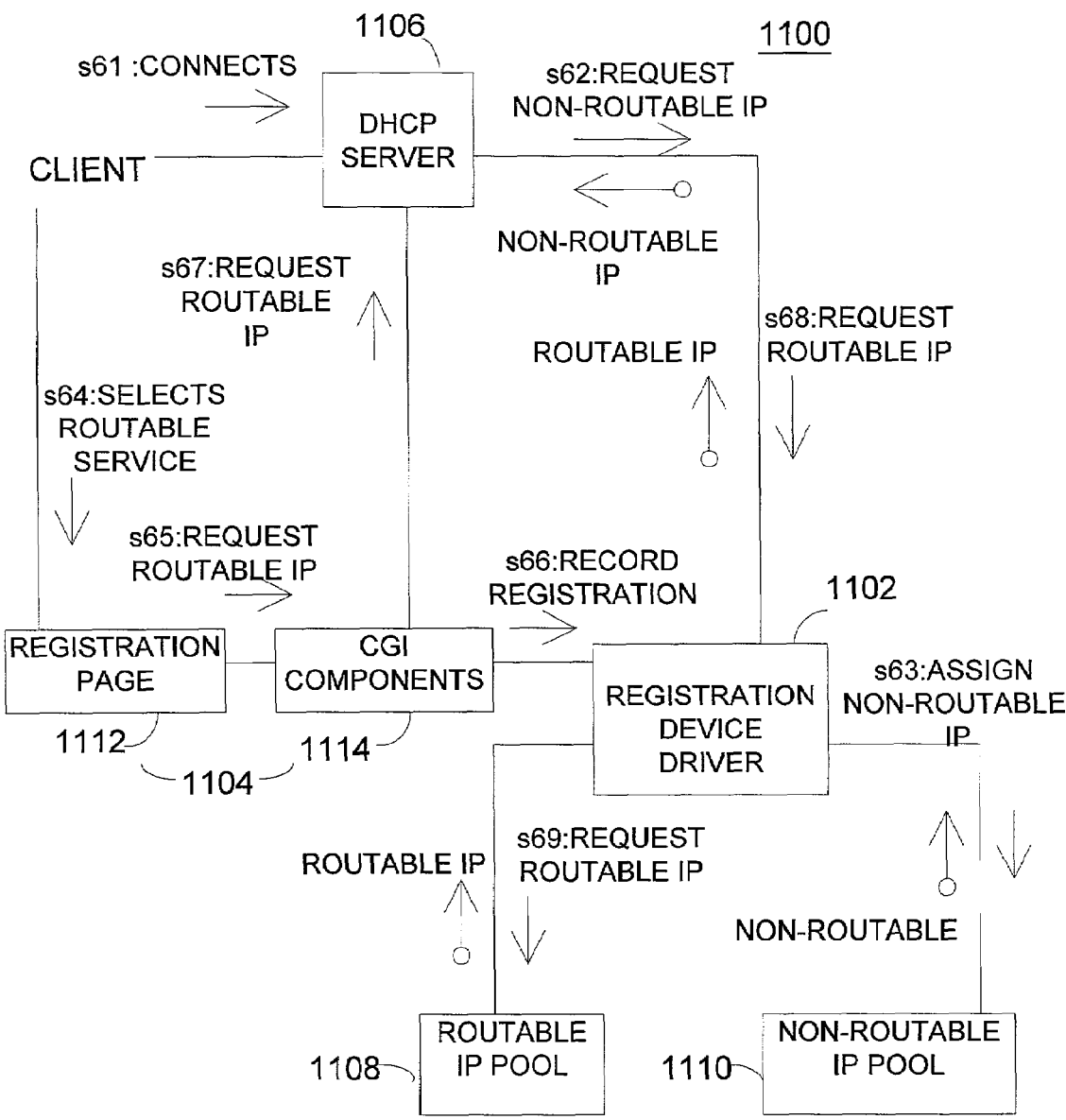
FIG. 16 shows an example of the components and interactions of the VBN Server 1100 according to a second embodiment.

FIG. 16 shows the breakdown of the core components and their interactions of the VBN Server (RealIP) 1100 according to the second embodiment. The VBN Server 1100 comprises Registration Device Driver 1102, Registration WEB Server 1104 and DHCP Server 1106.

Registration Device Driver (Sometimes Referred to as Soln Device)

The Registration Device Driver 1102 is incorporated into the VBN Operating System (OS) Kernel. The Registration Device Driver 1102 is a pseudo driver in that it is not actually associated with any physical device.

The Registration Device Driver 1102 maintains the pool of IP addresses rather than the DHCP Server and maintains a mapping of registered clients and assigned addresses. In this manner, the Registration Device Driver 1102 maintains both a pool of routable addresses 1108 and a pool of non-routable addresses 1110.

The Registration Device Driver 1102 also maintains the driver state information including a range type that is used to indicate what ranges are routable and non-routable (Premium/RealIP or Standard).

According to the functionality of the Registration Device Driver 1102, the reassignment of user IP addresses from routable to non-routable and visa-versa is properly handled.

Registration Web Server

The Registration WEB Server 1104 is a WEB Server that serves local content for the VBN Server 1100. This includes the Registration WEB pages, the administration WB pages and Configuration WEB pages.

The Registration WEB pages serves as a client's gateway to the services provided by the VBN Server 1100. The registration pages offers the clients the opportunity to access RealIP.

DHCP Server

The DHCP Server 1106 issues the request command to the Registration Device Driver 1102 according to the user's request. The Registration Device Driver 1102 will assign the address based on the request command.

The Function of the RealIP

When the DHCP server 1106 is contacted upon client connection (step s61), the DHCP server 1106 requests a non-routable IP address to the Registration Device Driver 1102 (step s62). By receiving the request for a non-routable IP address, the Registration Device Driver 1102 assigns a non-routable IP address from the pool of non-routable addresses 1110 (step s63). The DHCP server 1106 receives the non-routable IP address from the Registration Device Driver 1102. Therefore, the non-routable address is assigned to the client.

The client may interactively request the use of a routable IP address through HTML pages (Registration page 1112) which reside on the VBN server 1100 (step s64). When the CGI components 1114 that underlie the functionality of the HTML pages accepts the request for a routable IP address (step s65), the CGI components 1114 communicate the request to the Registration Device Driver 1102. The Registration Device Driver 1102 records registration (step s66).

The Registration Device Driver 1102 responds with an address allocated from the pool of routable addresses 1108 (step s69), and releases the temporary non-routable IP address previously assigned. The DHCP server 1106 receives the routable IP address from the Registration Device Driver 1102. The routable address is assigned to the client.

Since the Registration Device Driver 1102 maintains the mapping of clients to allocated IP addresses, both routable and non-routable addresses may be assigned on request.

Registration Process-Routable IP Service

Figure 17:
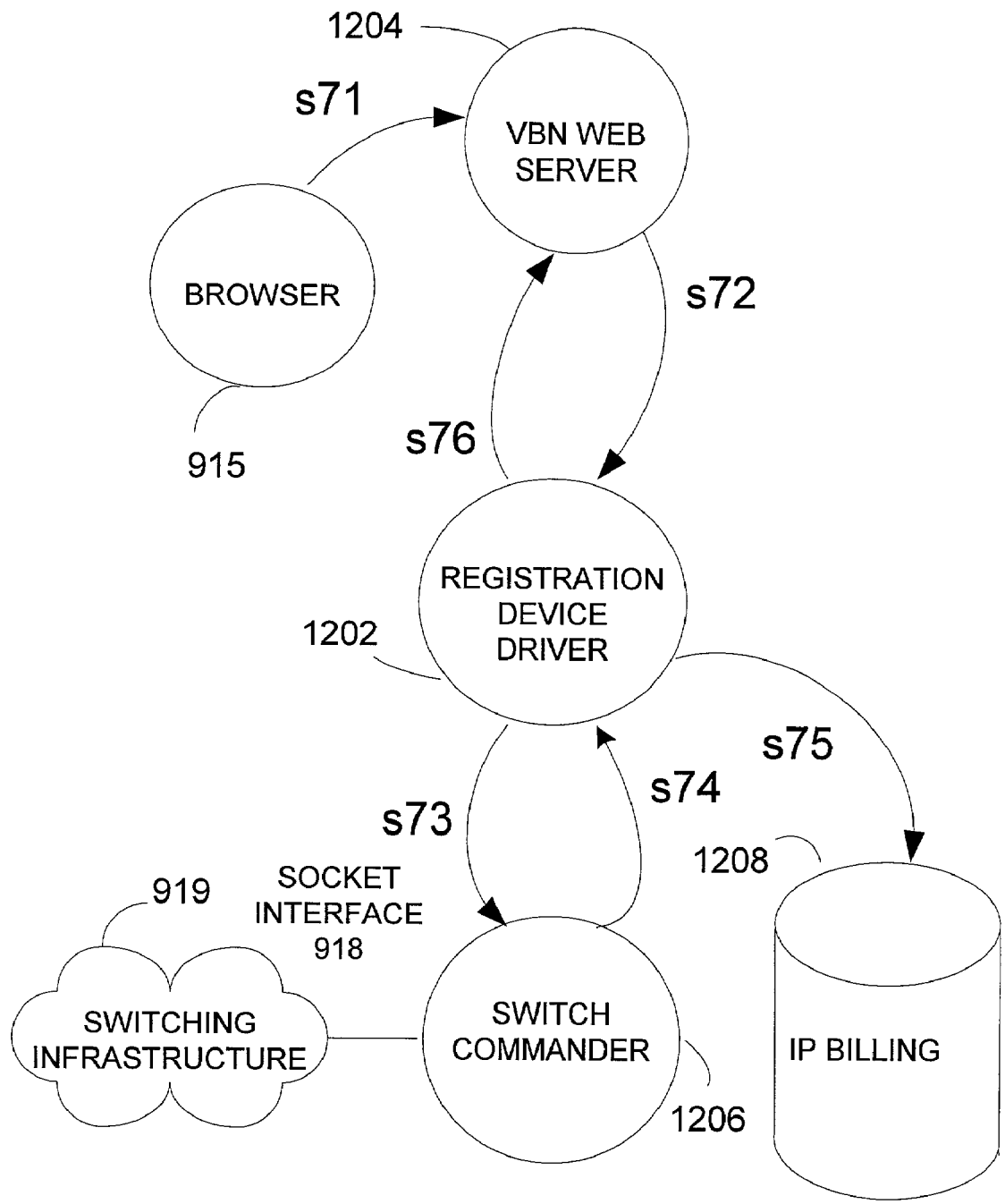
FIG. 17 shows an example of Registration processing according to the second embodiment.

FIG. 17 shows a process for registration for routable IP service according to the second embodiment. Registration Device Driver 1202 and VBN Web Server 1204 in FIG. 17 correspond to the Registration Device Driver 1102 and the Registration WEB Server 1104 in FIG. 16 respectively. Switch Commander 1206 corresponds to the Switch Commander 917 in FIG. 3.

Step s71: The Client/Browser 915 sends data including room number, registration type (Routable IP Service) to the VBN Web Server 1204. If subscribing to RealIP service, the lease period will also be sent.

Step s72: The VBN Web Server 1204 passes data to the Registration Device Driver 1202.

Step s73: The Registration Device Driver 1202 will send two command requests to the Switch Commander 1206. The first command will create a unique Routable-IP VLAN. The second will add the user's port to the Routable-IP VLAN.

Step s74: For each command completion, the Switch Commander 1206 will report command status to the Registration Device Driver 1202.

Step s75: If the commands are successful, the Registration Device Driver 1202 will register the user by assigning a routable IP address and sending the port, IP address and registration type to the IP Billing database 1208.

Step s76: Registration status is returned to the VBN Web Server 1204.

It will be understood by those skilled in the art that RealIP may also execute on UNIX type operation systems.

It is noted that the RealIP 1100 can allow users to change their IP addresses from routable to non-routable.

RealIP SERVER

RealIP Server according to the second embodiment will be described. As mentioned above, the RealIP is the capability of allowing users to change their IP addresses from one pool of addresses to a different pool of addresses, specifically from non-routable (Standard Internet) to routable (Premium Internet) and visa-versa.

The RealIP Server further extends the RealIP concept to allow pools of routable addresses to be maintained on one or more remote servers which may or may not make those same pools available to other VBN Servers (or the SolutionIP Servers).

The process of accessing these remote pools of addresses and establishing an IP tunnel involves the VBN Server connecting to the RealIP Server.

When a client registers for RealP on the VBN Server connecting to the RealIP Server, the VBN Server requests a RealIP from the RealIP Server. The VBN Server asks for an IP address which it then offers to its client as if the address were available locally.

Traffic from the client will be routed through the tunnel to the RealIP Server that supplied the address. The Traffic to the client will be routed the RealIP Server, and thence through the IP tunnel to the VBN Server and on to the client.

Figure 18:
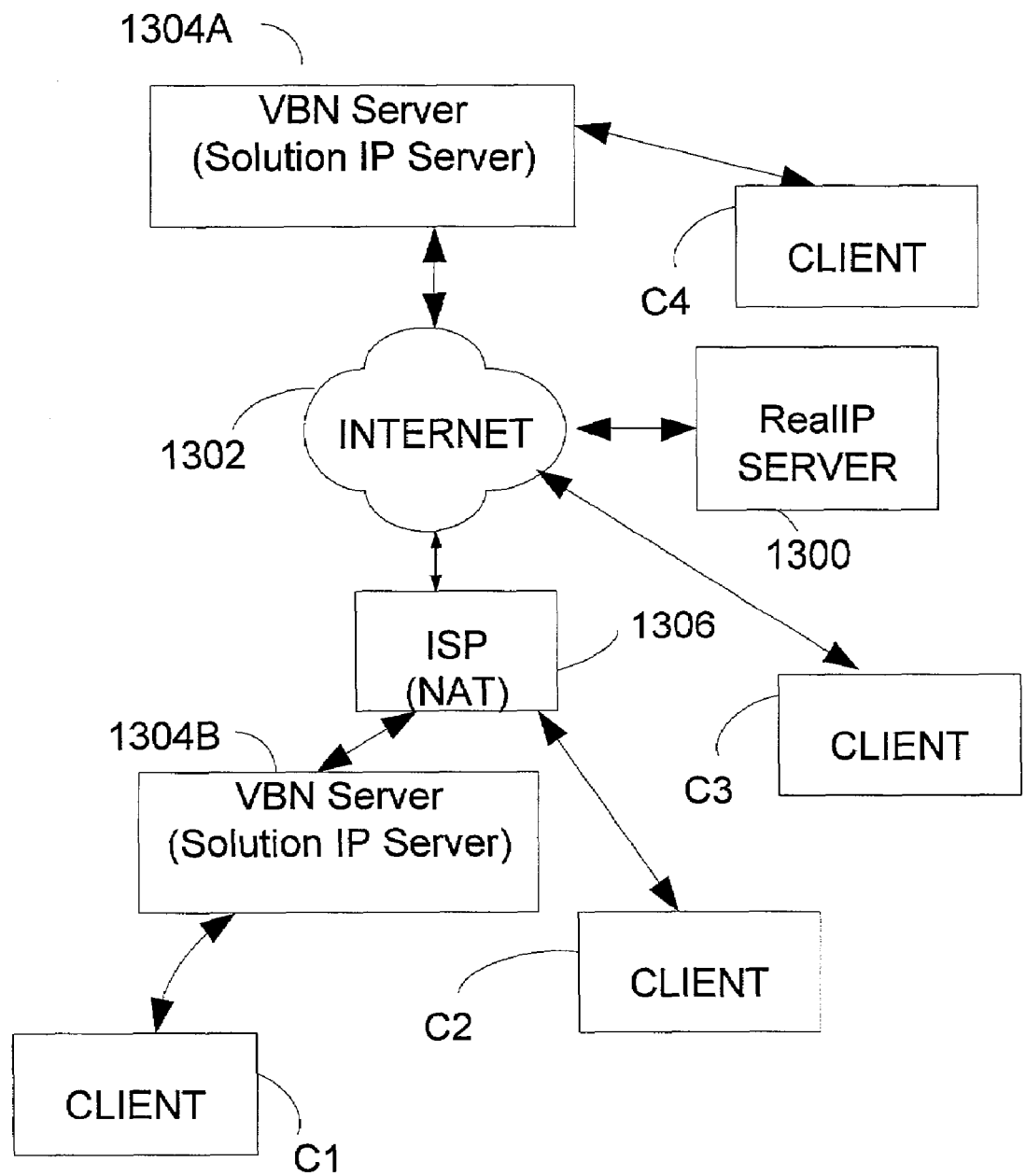
FIG. 18 shows an example of the relation between RealIP Server and VBN Server according to the second embodiment.

FIG. 18 shows an example of a combination with RealIP Server and VBN Server according to the second embodiment. Referring to FIG. 18, clients C1 and C4 are normal clients. The Clients C1 and C4 connect through their VBN Server to the Internet 1302.

The Basic Scenario

The client C4 wants a routable IP address. VBN Server 1304A does not have a routable address pool or it has run out of routable addresses. RealIP Server 1300 has an address available.

1. The VBN Server 1304A connects to the RealIP Server 1300 via the Internet 1302 and requests a address.

2. The RealIP Server 1300 returns a routable address to the VBN Server 1304A based on the request from the VBN Server 1304A.

3. The VBN Server 1304A then provides the routable IP address to the client C4.

As far as the client is concerned, the routable IP address is locally provided. At this point, traffic from the client can be sent directly to the Internet 1302 and traffic to the client will go to the RealIP Server 1300 through the tunnel to the VBN Server 1304A and then to the client C4.

The other scenarios are all variations to the basic scenario described above.

Another Scenario

The following scenario involves VBN Server 1304B and the client C1 connected to the VBN Server 1304B. The VBN Server 1304B accesses the Internet 1302 via Internet Service Provider (ISP) 1306. In the ISP 1306, client's network address is processed by the Network Address Translation (NAT). Therefore, the VBN Server 1304B could not normally supply routable IP addresses to it's clients.

However, with the RealIP Server 1300, and by routing outgoing client traffic through the tunnel rather than directly to the Internet 1302, the VBN Server 13 04B can provide routable IP addresses to it's clients.

Numerous modifications, variations and adaptations may be made. In FIG. 18, client C2 accesses the Internet 1302 via ISP 1306 and client C3 accesses the Internet 1302 directly. A further extension to this invention is to provide software to the clients C2 and C3 that will allow them communicate directly with the RealIP Server 1300 and make use of RealIPs supplied by the RealIP Server 1300 directly. In this case, the client would always route outgoing traffic through the tunnel, as it could not be sure that the client is not behind NAT process of ISP 1306 .

Third Embodiment

A system according to a third embodiment is described with reference to FIGS. 19-23. In FIGS. 19-23, "Q", "U", and "VLID" designate 802.1Q tagged, untagged and VLAN ID, respectively. The system of the third embodiment encompasses both RealIP and IVLAN.

Figure 19:
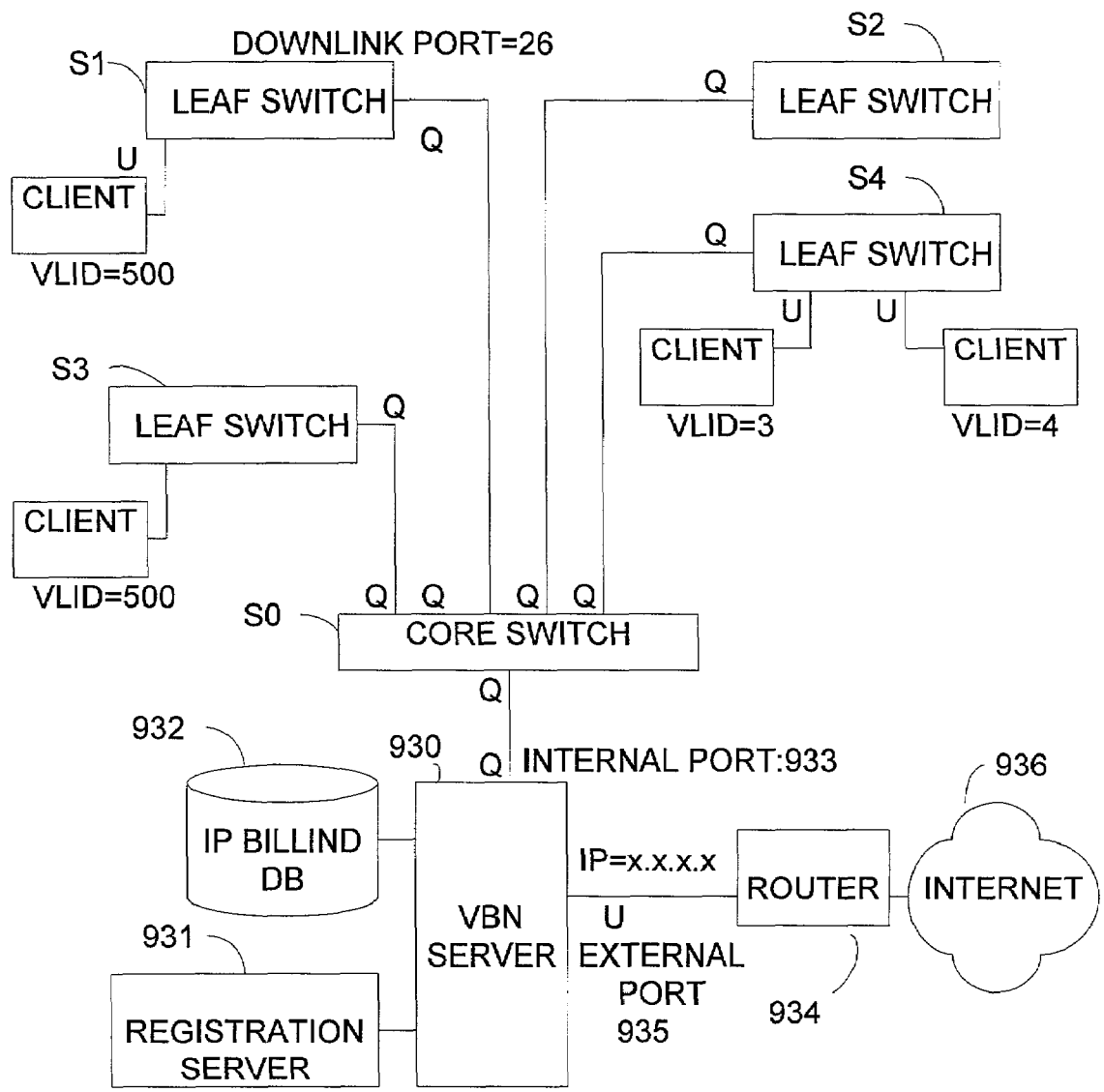
FIG. 19 shows a system architecture of a third embodiment.

FIG. 19 shows the core components of the system according to the third embodiment. Referring to FIG. 19, the core switch S0 connects to the VBN Server 930 via internal port 933 and leaf switches S1-S4. The leaf switches connect the room ports to the core switch S0. The VBN Server 930 connects to the Router 934 via external port 935.

The VBN Server 930 comprises;

1. Registration Driver which tracks client registration and VLANs defined on the switches;
2. Packet Driver which processes packets leaving the client LAN by removing VLAN tag (convert 802.1Q to standard format ) and processes packets entering the VLAN by tagging packets (convert standard format to 802.1Q);
3. DHCP Server which is customized to return IP addresses from routable and non-routable pools assigned by the Registration Device Driver;
4. IPWF which redirects non-registered clients to Registration Server 931 and provides IP masquerading for Standard Internet Service clients;
5. ARP Server which is customized for clients with static IP configuration. The server returns the hardware address of it's internal port regardless of the gateway IP specified by the client.

6. Solsnmpd which issues SNMP commands to the switches to return the status and configure VLANs.

The Registration Server 931 comprises;

1. Registration component which provides a HTML pages to register/unregister for Standard Internet and Premium Internet as well as provide Group Access services; and
2. Virtual Concierge component which provides information relevant to the hotel and local community (e.g. hotel services, restaurants, museums, theaters, etc.).

IP Billing database 932 records services registrations and provides/contains the applicable usages fees from the Billing Software.

The core switch S0 forwards or filters traffic based on the VLID specified in the Q-Tag inserted in the Ethernet frame.

Standard Internet Service is provided when clients have non-routable IP addresses. Premium Internet Service is provided when clients have routable IP addresses. RealIP enables users to switch their addresses between non-routable and routable. IVLAN enhances RealIP, by putting clients registered for Internet access into private VLANs, whether their addresses are routable or non-routable so their traffic to the server is protected from other client's traffic. The core switch S0 with the filtering capabilities enables their traffic to be protected.

FIGS. 20-23 show various user scenarios possible using the architecture shown in FIG. 19. The scenarios are illustrated using a client with a dynamic TCP/IP configuration (that is, it uses DHCP). The Standard Internet Service and the various Group scenarios can also be used by a static client. The only difference in the scenario steps for DHCP and fixed clients are the following 3 steps.

For the static client these steps would be as follows;

1. The client plugs in. The client broadcasts an ARP request to discover the hardware (i.e. MAC) address of it's configured default gateway.
2. The VBN Server 930 detects the client traffic and assigns an IP address from a pool of standard non-routable IP address. This assignment is recorded in an operating system kernel registration structure that also tracks such information as the client's MAC, room number and original IP address.
3. In response to the ARP request, the server responds with it's internal port hardware address regardless of the IP specified.

Standard Internet Service Registration

Figure 20:
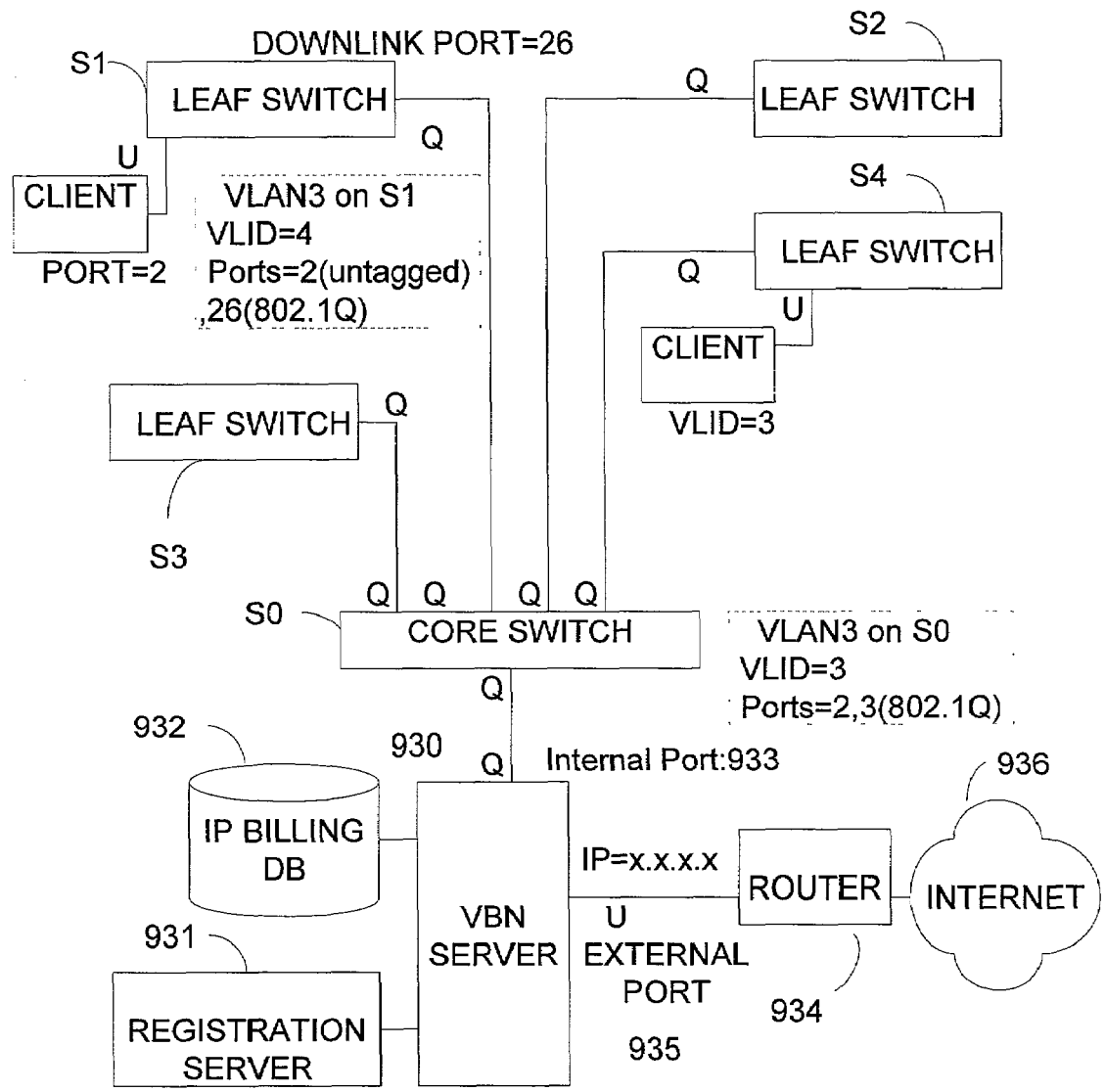
FIG. 20 shows a scenario for Standard Internet Service Registration in the structure shown in FIG. 19.

Standard Internet Service is a basic form of Internet access which will be provided to users for basic web surfing and the collection of remote e-mail. FIG. 20 depicts a scenario where the user connected to switch S1, Port 2, registers for Standard Internet Service.

Scenario:

1. The client plugs in to leaf switch S1, port 2. The client software sends a DHCP request to the VBN Server 930.
2. The VBN Server 930 detects the client traffic and assigns an IP address from a pool of non-routable IP addresses. This assignment is recorded in an operating system kernel registration structure that also tracks the client's MAC, room number and original IP address.
3. The DHCP Server of the VBN Server 930 returns the assigned IP address to the client.
4. The client opens a Web browser and is redirected to the Registration page by a firewall rule installed on the VBN Server 930. The user selects "Standard Internet Service".
5. Registration for Standard Internet Service results in the following:

For billing purpose, the service registration is recorded in the IP Billing database 932.

The Registration Driver of the VBN Server 930 assigns the client to the next available Internet service VLAN ID. For this scenario, the client is assigned to "VLAN 3" with VLID3.

The registration process creates "VLAN3" on S1 and adds the user's port (2) to the definition as untagged. To communicate with the core switch S0, downlink port (26) of the leaf switch S1 is added to the VLAN as 802.1Q tagged.

To communicate with the VBN Server 930, "VLAN3" is created on the core switch S0. "VLAN3" member ports include 3 (uplink to the leaf switch) and 2 (downlink to the VBN Server 930). Both ports are specified as 802.1Q tagged.

The Registration Driver of the VBN Server 930 records the necessary VLAN information.

6. When registration is complete, the user can access the Internet 936.

Standard Internet users will always have their IP address masqueraded to the IP address of the SolutionIP Server's gateway (i.e. X.X.X.X). If there is another client in a VLAN with VLID 3 defined on switch S4, the clients (S1 and S4) are mutually exclusive by forwarding rules specified in a packet filter installed on the core switch. This prevents their clients from seeing each other's network traffic, and is the mechanism used to overcome the VLAN limitations of the switches.

When a Standard Internet Access Service usage period expires, the software shall:

a) remove the user port from the Internet VLAN;
b) add the user port back to the Open VLAN (VLAN ID=2);
c) remove the downlink port on the user leaf switch, and the downlink port on any cascaded switches between the user leaf switch and the core switch, from the Internet VLAN;
d) remove the VLAN definition from the user leaf switch;
e) remove the uplink port on the core switch S0 (to the user leaf switch) form the Internet VLAN;
f) remove the downlink port on the core switch (to the VBN Server 930) from the Internet VLAN, if no other leaf switch contains the VLAN definition;
g) remove the VLAN definition from the core switch, if no other leaf switches contain the definition; and
h) return the Internet VLAN ID back to the pool of Standard Internet Service VLAN IDs.

It is noted that "an Internet VLAN" is a VLAN group with only one member for the purposes of providing client security. For convenience a range of VLAN IDs are selected for use exclusively for Internet VLANs. This range is used in configuring the core switch so Internet VLAN IDs can be re-used on multiple leaf switches without allowing clients in the same VLAN to communicate.

Premium Internet Service Registration

Premium Internet service will be offered for those VBN users who require the use of a routable IP address for the use of VPN software or to allow for the temporary sharing of files (e.g. a web server) for external access outside the VBN network.

Figure 21:
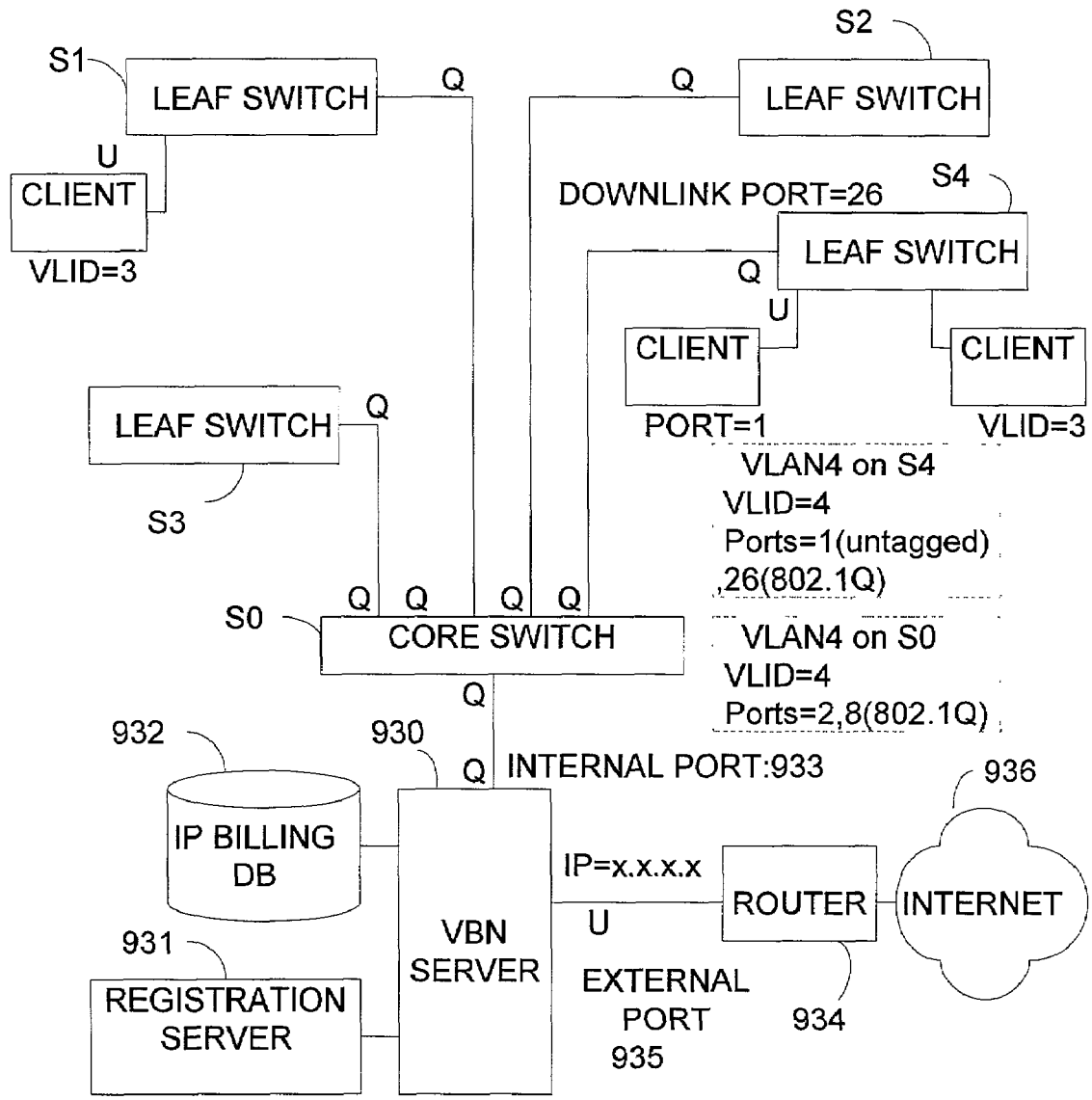
FIG. 21 shows a scenario for Premium Internet Service Registration in the structure shown in FIG. 19.

FIG. 21 shows a scenario where the user connected to switch S4,Port 1, registers for Premium Internet Service.

Scenario:

1. A user is currently registered on the leaf switch S1,port 2 for Standard Internet Service. This client has been assigned VLAN ID3(VLID=3).

2. A user is currently registered on the leaf switch S4,port 9 for Standard Internet Service. This client has been assigned VLAN ID3(VLID=3).
3. A new client plugs in to the leaf switch S4, port 1. The client software send a DHCP request to the VBN Server 930.
4. The VBN Server 930 detects the client traffic and assigns an IP address from a pool of non-routable IP addresses. This assignment is recorded in an operating system kernel registration structure that also tracks the client's MAC, room number and original IP address.
5. The DHCP Server of the VBN Server 930 returns the assigned IP address to the client.
6. The client opens a Web browser and is redirected to the Registration page by a firewall rule installed on the VBN Server 930. The user selects "Premium Internet Service".
7. Registration for Premium Internet Service results in the following:
   The client is assigned a routable IP address.
   The client's registration record is modified by replacing the currently assigned IP with the routable IP address.
   For billing purpose, the service registration is recorded in the IP Billing database 932.
   The Registration Driver of the VBN Server 930 assigns the client to the next available Internet service VLAN ID. For this scenario, the client is assigned to "VLAN 4" with VLID4.
   The registration process creates "VLAN4" on the leaf switch S4 and adds the user's port (1) to the definition as untagged. To communicate with the core switch S0, downlink port (26) of the leaf switch S4 is added to the VLAN as 802.1Q tagged.
   To communicate with the VBN Server 930, "VLAN4" is created on the core switch S0. "VLAN4" member ports include 8 (uplink to the leaf switch) and 2 (downlink to the VBN Server 930). Both ports are specified as 802.1Q tagged.
   The Registration Driver of the VBN Server 930 records the necessary VLAN information including the configuration of the switches.
8. When registration is complete, the user can access the Internet 936 and external users can route directly to the client PC.
   Two clients are registered with VLID 3. One is defined on switch S1 and the other on switch S4. The traffic for these 2 clients, S1 and S4, maintains mutual exclusivity by forwarding rules specified in a packet filter installed on the core switch S0. This prevents these clients from seeing each other's network traffic.
   When a Premium Internet Access Service usage period expires, the software shall:
   a) remove the user port from the Internet VLAN;
   b) add the user port back to the Open VLAN (VLAN ID=2);
   c) remove the downlink port on the user leaf switch, and the downlink port on any cascaded switches between the user leaf switch and the core switch, from the Internet VLAN;
   d) remove the VLAN definition from the user leaf switch;
   e) remove the uplink port on the core switch S0 (to the user leaf switch) form the Internet VLAN;
   f) remove the downlink port on the core switch (to the SolutionIP server 930) from the Internet VLAN, if no other leaf switch contains the VLAN definition;
   g) remove the VLAN definition from the core switch, if no other leaf switches contain the definition; and
   h) return the Internet VLAN ID back to the pool of Premium Internet Service VLAN IDs.

Creating a VLAN Group

Figure 22:
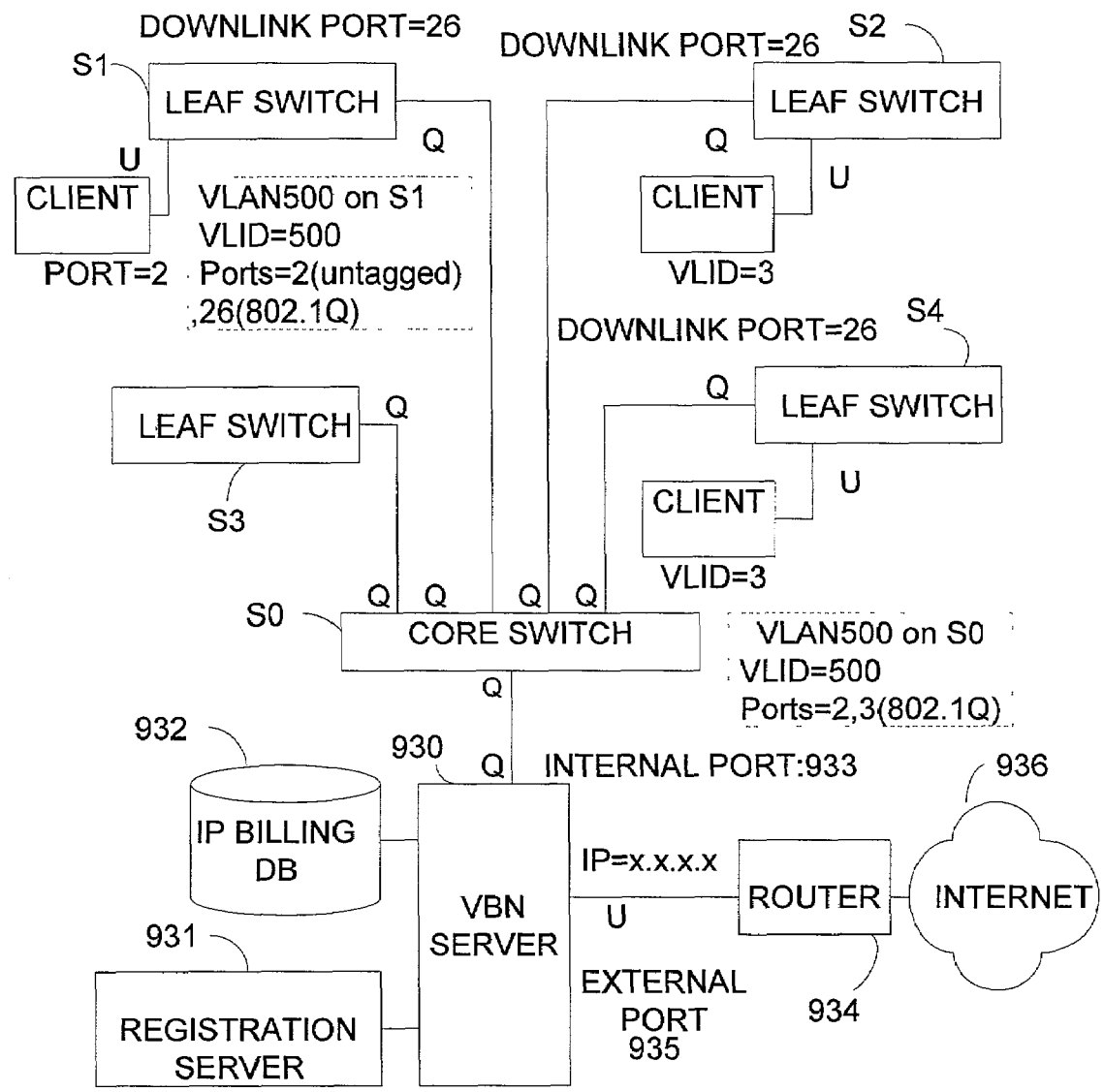
FIG. 22 shows a scenario for Create VLAN Group in the structure shown in FIG. 19.

FIG. 22 shows a scenario where the user connected to leaf switch S1, port 2,creates a VLAN group. Throughout this scenario this user is referred to as the group administrator.

Scenario:
1. The client plugs into leaf switch S1 port 2. The client software sends a DHCP request to the VBN Server 930.
2. The VBN Server 930 detects the client traffic and assigns an IP address from a pool of standard non-routable IP addresses. This assignment is recorded in an operating system kernel registration structure that also tracks the client's MAC, room number and original IP address.
3. The DHCP Server of the VBN Server 930 returns the assigned IP address to the client.
4. The client opens a Web browser and is redirected to the Registration page by a firewall rule installed on the VBN Server 930. The user selects "Group Service Administration". To create the group, the client selects "Create Group" function and provides the following information: group name, administration password, and group access password. When creating a group the client assumes the role of the group administrator.
5. Creating a VLAN Group results in the following:
   The administrator is assigned a non-routable IP address.
   The Registration Driver of the VBN Server 930 binds the specified VLAN name to the next available Group Service VLAN ID. For this scenario, the group "VLAN 500" is assigned VLID 500.
   For billing purposes, group creation and the applicable service fee are recorded in the IP Billing database 932.
   The registration process creates "VLAN 500" on S1 and adds the administrator's port (2) to the definition as untagged. To communicate with the core switch S0, downlink port (26) of the leaf switch S2 is added to the VLAN as 802.1Q tagged.
   As it is likely that group users will span network switches, "VLAN 500" is created on the core switch S0. Port 6 (uplink to leaf switch S1) and the port that the VBN Server is connected to are defined as the only member ports.
   The Registration Driver records the necessary VLAN information.

Scenario of VLAN Group Service Registration

Figure 23:
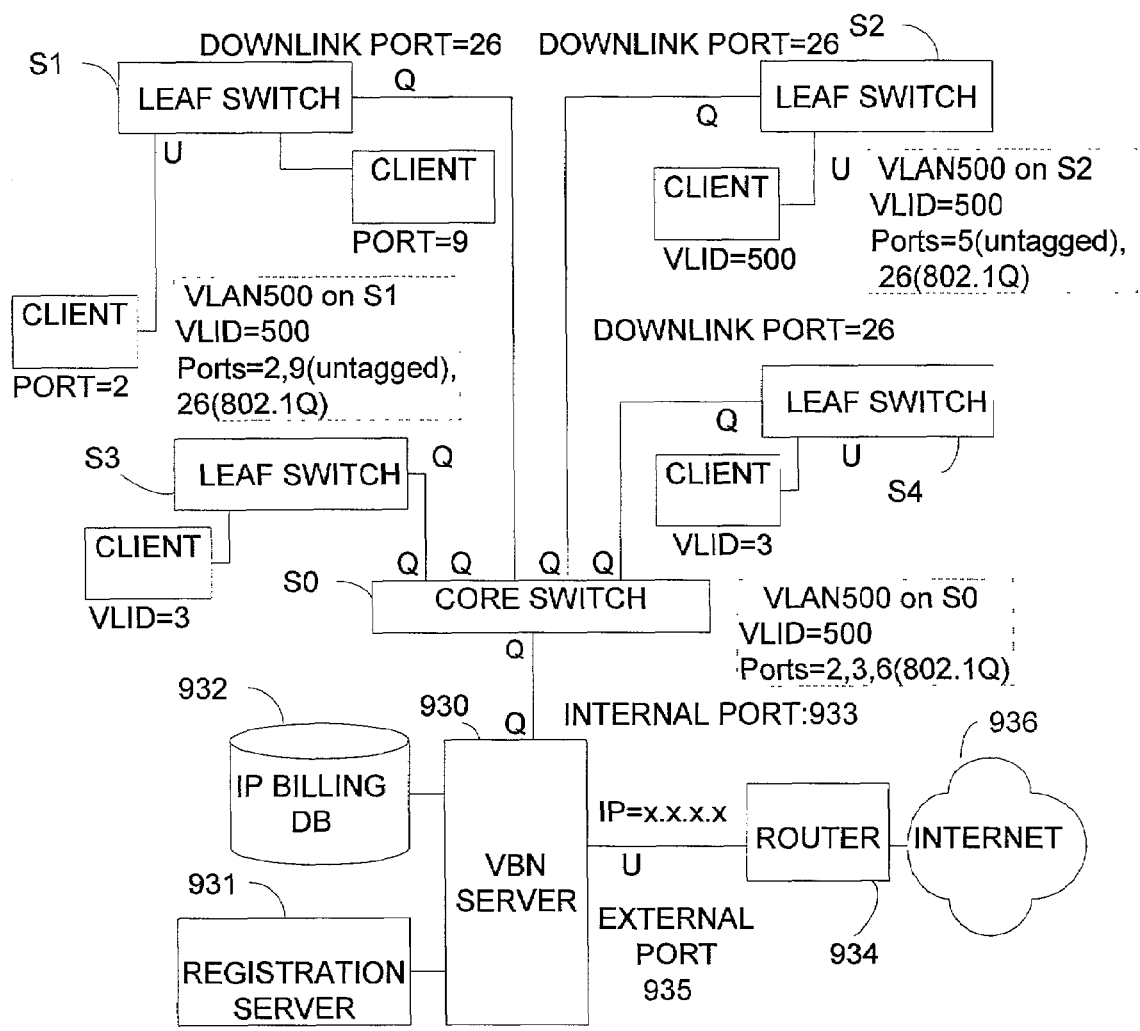
FIG. 23 shows a scenario for VLAN Group Service Registration in the structure shown in FIG. 19.

FIG. 23 shows a scenario where the user connected to leaf switch S2, port 5, registers for VLAN Group Service. It is assumed that the group "VLAN 500" has been created and a user connected to leaf switch S1, port 9, has already joined as a "VLAN 500" member.

Scenario:
1. The client plugs in to leaf switch S2,port 5. The client software sends a DHCP request to the VBN Server 930.
2. The VBN Server 930 detects the client traffic and assigns an IP address from a pool of standard non-routable IP addresses. This assignment is recorded in an operating system kernel registration structure that also tracks the client's MAC, room number and original IP address.
3. The DHCP Server of the VBN Server 930 returns the assigned IP address to the client.
4. The client opens a Web browser and is redirected to the Registration page by a firewall rule installed on the VBN Server 930. The user selects "Group Access Service" and specifies the group name and required access password.
5. Registration for Group Access Service results in the following:
   The client is assigned a non-routable IP address.

The Registration Driver of the VBN Server 930 assigns the client to the appropriate Group Service based on the group name specified. For this scenario, the client is assigned to VLID500 which corresponds with the group "VLAN500".

The registration process creates "VLAN 500" on the leaf switch S2 and adds the user's port (5) to the definition as untagged. To communicate with the core switch S0, downlink port (26) of the leaf switch S2 is added to the VLAN as 802.1Q tagged.

To communicate with other "VLAN500" users, the uplink port (6) connecting leaf switch S2 is added to the "VLAN500" definition on the core switch S0.

The Registration Driver of the VBN Server 930 records the necessary VLAN information.

6. When group creation is complete, the user can collaborate with other users in "VLAN500"

When the usage period for a VLAN Group expires, the software shall:
a) remove all registered user ports from the Group VLAN;
b) add all user ports from the Group VLAN back to the Open VLAN (VLAN ID=2);
c) remove the downlink port on the user leaf switch, and the downlink port on any cascaded switches between the user leaf switch and the core switch, from the Group VLAN;
d) remove the VLAN definition from all user leaf switches;
e) remove the uplink and downlink ports on the core builder from the Group VLAN;
f) remove the Group VLAN definition from the core switch; and
g) return the Group VLAN ID associated with the group back to the pool of available Group VLAN IDs.

It will be understood by those skilled in the art that IVLAN may execute on a variety of operating systems (UNIX, Linux, etc).

Numerous modifications, variations and adaptations may be made to the particular embodiments of the invention described in the documents attached herein, without departing from the scope of the invention, which is defined in the claims.

What is claimed is:

1. A method for automatically providing enhanced and secure access to a group of users initiated by a non-technically trained user on a computer network without intervention of information systems personnel, the method comprising the steps of:
1) receiving a request from a non-technically trained user of a visitor based network (VBN) to establish a group of users in the VBN, the request including a group identifier which includes a group name and password provided by the user and identifies the group;
2) configuring, in response to the request, a network infrastructure of the VBN to support the group without intervention of information systems personnel;
3) allowing other non-technically trained users of the VBN to join the group by using the group name and password;
4) further configuring the network infrastructure of the VBN to support the joining users without intervention of information systems personnel; and
5) dissolving the group based on predetermined rules including a predetermined rule to dissolve the group at expiry of a predetermined period,
wherein the step of further configuring the network infrastructure includes the step of configuring a switch port that a joining user is connected to with a VLAN associated with the group.

2. The method of claim 1 wherein the group of users is composed of one or more users.

3. The method of claim 1 wherein the network infrastructure includes a physical local area network.

4. The method of claim 1 wherein the step of configuring a network includes the step of establishing the virtual local area network (VLAN) on a physical local area network.

5. The method of claim 1 wherein the step of configuring a network infrastructure includes the step of configuring switches that are IEEE802.1Q compliant.

6. The method of claim 5 wherein the step of configuring switches includes a use of Q-tag.

7. The method of claim 1 wherein the step of dissolving the group includes revoking the group identifier.

8. The method of claim 7 wherein the step of dissolving further includes the step of returning ports of switches supporting a VLAN associated with the dissolved group to a default state and removing all references to the VLAN associated with the dissolved group from the switches.

9. A computer readable medium containing computer instructions for executing in a computer of a method for automatically providing enhanced and secure access to a group of users initiated by a non-technically trained user on a computer network without intervention of information systems personnel, the method comprising the steps of:
1) receiving a request from a non-technically trained user of a visitor based network (VBN) to establish a group of users in the VBN, the request including a group identifier which includes a group name and password provided by the user and identifies the group;
2) configuring a network infrastructure of the VBN to support the group without intervention of information systems personnel;
3) allowing other non-technically trained users of the VBN to join the group by using the group name and password;
4) further configuring the network infrastructure of the VBN to support the joining users without intervention of information systems personnel; and
5) dissolving the group based on predetermined rules including a predetermined rule to dissolve the group at expiry of a predetermined period,
wherein the step of further configuring the network infrastructure includes the step of configuring a switch port that a joining user is connected to with a VLAN associated with the group.

10. A server to provide enhanced and secure access to a group of users initiated by a non-technically trained user on a computer network without intervention of information systems personnel, the server comprising:
1) a registration module to receive from a non-technically trained user of a visitor based network (VBN) a request to create a group of users in the VBN, the request including a group identifier which includes a group name and password provided by the user and identifies a group of users, and to receive from other non-technically trained users of the VBN a request to join the group using the group name and password;
2) a registration driver to register the user and the other users to access the group of users, assign the group of users and maintain registration information and state information of a network infrastructure of the VBN associated with the group of users according to the group identifier in response to the requests from the user without intervention of information systems personnel, and to dissolve the group based on predetermined rules including a predetermined rule to dissolve the group at expiry of a predetermined period;

3) a module to assign VLAN tags to the group based on registration status; and 4) a packet driver module to insert/remove VLAN tags from packets based on the registration status, 5) a switch commander for configuring a network infrastructure of the VBN to support the group without intervention of information systems personnel in response to the request for creating the group of users, and configuring a switch port that a joining user is connected to with a VLAN associated with the group.

11. The server of claim 10 wherein the VLAN tags are Q-tags of IEEE802.1Q.

12. The server of claim 10 wherein the state information of a network infrastructure is information on the switches that are IEEE802.1Q compliant.

13. The server of claim 10 wherein the module to construct VLAN tags comprises the SNMP module.

14. The server of claim 10 wherein the module further comprises a web based user interface.

15. The server of claim 10 wherein the registration module further receives from the user a request for showing information associated with the group of users.

16. The server of claim 10 wherein the registration module further receives from the user a request for deleting the group of users.

17. The method as claimed in claim 1 wherein the receiving step receives the request including a usage period provided by the user; and the dissolving step dissolves the group when the usage period expires.

18. The server as claimed in claim 10 wherein the registration module receives the request including a usage period provided by the user; and the registration driver dissolves the group when the usage period expires.

19. The method of claim 1 further comprising the steps of:

automatically determining and assigning an internet protocol (IP) address for the user connected on the VBN;

registering the user in association with addressing information including the assigned IP address and a Media Access Control (MAC) address of the user; and storing and maintaining the addressing information for the registered user.

20. The server of claim 10, wherein the registration module automatically determines and assigns an Internet Protocol (IP) address for the user connected on the VBN, and registers the user in association with addressing information including the assigned IP address and a Media Access Control (MAC) address of the user.

* * * * *